(12) United States Patent
 Zeabari et al.

(10) Patent No.: US 11,939,806 B2
(45) Date of Patent: Mar. 26, 2024

(54) INTEGRATED CONTROLLER WITH SENSORS FOR ELECTROMECHANICAL BIASING MEMBER

(71) Applicant: MAGNA CLOSURES INC., Newmarket (CA)

(72) Inventors: John Glenn Zeabari, Highland, MI (US); Joshua Michael Bernhardt, West Bloomfield, MI (US)

(73) Assignee: MAGNA CLOSURES INC., Newmarket, CA (US)

( * ) Notice: Subject to any disclaimer, the term of this patent is extended or adjusted under 35 U.S.C. 154(b) by 779 days.

(21) Appl. No.: 17/018,772

(22) Filed: Sep. 11, 2020

(65) Prior Publication Data

US 2020/0408025 A1 Dec. 31, 2020

Related U.S. Application Data

(63) Continuation of application No. 15/991,289, filed on May 29, 2018, now Pat. No. 10,774,571.

(60) Provisional application No. 62/512,468, filed on May 30, 2017, provisional application No. 62/645,282, filed on Mar. 20, 2018.

(51) Int. Cl.
*E05F 15/622* (2015.01)
*B60J 5/04* (2006.01)
*B60J 5/10* (2006.01)
*E05C 19/16* (2006.01)
(Continued)

(52) U.S. Cl.
CPC ............. *E05F 15/622* (2015.01); *B60J 5/047* (2013.01); *B60J 5/102* (2013.01); *E05C 19/166* (2013.01); *F16D 27/10* (2013.01); *F16D 43/21* (2013.01); *E05Y 2400/458* (2013.01); *E05Y 2900/546* (2013.01)

(58) Field of Classification Search
CPC .......... E05F 15/622; B60J 5/047; B60J 5/102; E05C 19/166; F16D 27/10; F16D 43/21; E05Y 2400/458; E05Y 2900/546
See application file for complete search history.

(56) References Cited

U.S. PATENT DOCUMENTS 5,328,218 A 7/1994 Brusasco et al.
6,328,353 B1 12/2001 Barczynski et al.
(Continued)

FOREIGN PATENT DOCUMENTS

| CN | 205206575 U | 5/2016 |
|---|---|---|
| CN | 106320883 A | 1/2017 |
| WO | 2002068782 A1 | 9/2022 |

*Primary Examiner* — Michael D Lang

(57) ABSTRACT

An electromechanical biasing member for moving a closure panel between an open and a closed position relative to a motor vehicle body is provided. The electromechanical biasing member includes a housing having an inner cavity for housing an electric motor having a motor shaft and a rotary output member rotatable relative to the housing. An extension member within the housing and engageable with the rotary output member moves the closure panel between the open and closed positions in response to driving the electric motor. Also provided is a control unit positioned within the inner cavity and configured to drive the electric motor, the control unit including at least one controller board juxtaposed to the electric motor, and a plurality of control components mounted to the at least one controller board and configured to supply a drive signal to the electric motor and receive signals representative of operation of the electric motor.

20 Claims, 24 Drawing Sheets

(51) Int. Cl.
 *F16D 27/10* (2006.01)
 *F16D 43/21* (2006.01)

(56) References Cited

U.S. PATENT DOCUMENTS

| | | |
|---|---|---|
| 7,032,349 B2 | 4/2006 | Oberheide et al. |
| 7,294,986 B2 | 11/2007 | Marentette |
| 7,812,492 B2 | 10/2010 | Torres et al. |
| 8,109,163 B2 | 2/2012 | Hudson et al. |
| 9,461,521 B2 | 10/2016 | Pribisic |
| 9,776,483 B2 | 10/2017 | Shchokin et al. |
| 10,584,525 B2 | 3/2020 | Wang et al. |
| 2008/0046153 A1 | 2/2008 | Oualkadi |
| 2009/0320627 A1 | 12/2009 | Bochen et al. |
| 2014/0260233 A1 | 9/2014 | Giovanardi et al. |
| 2016/0312514 A1 | 10/2016 | Leonard et al. |
| 2017/0145727 A1 | 5/2017 | Yamagata et al. |
| 2017/0292310 A1 | 10/2017 | Podkopayev |

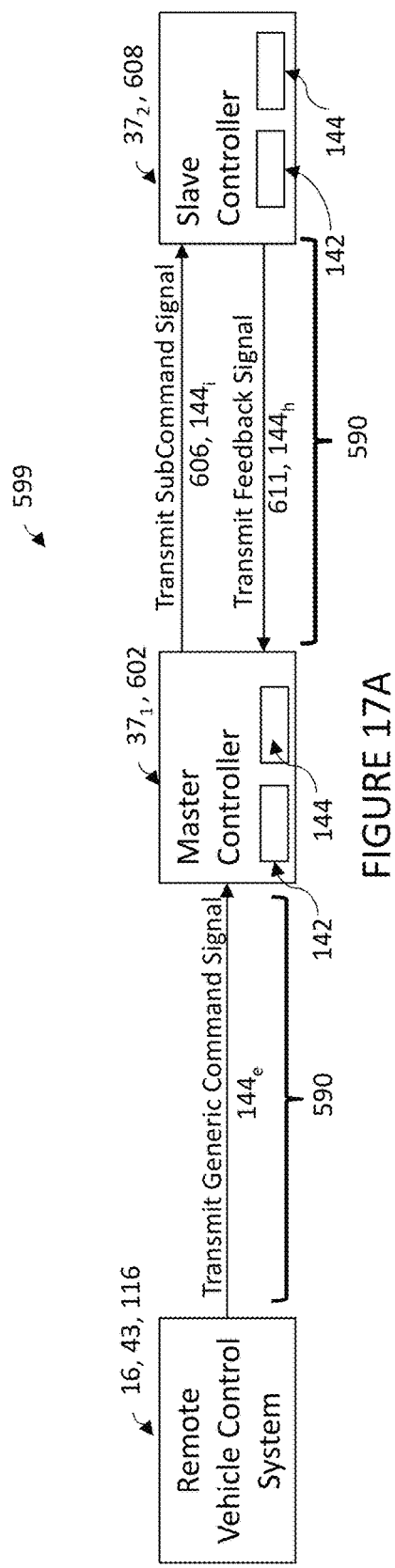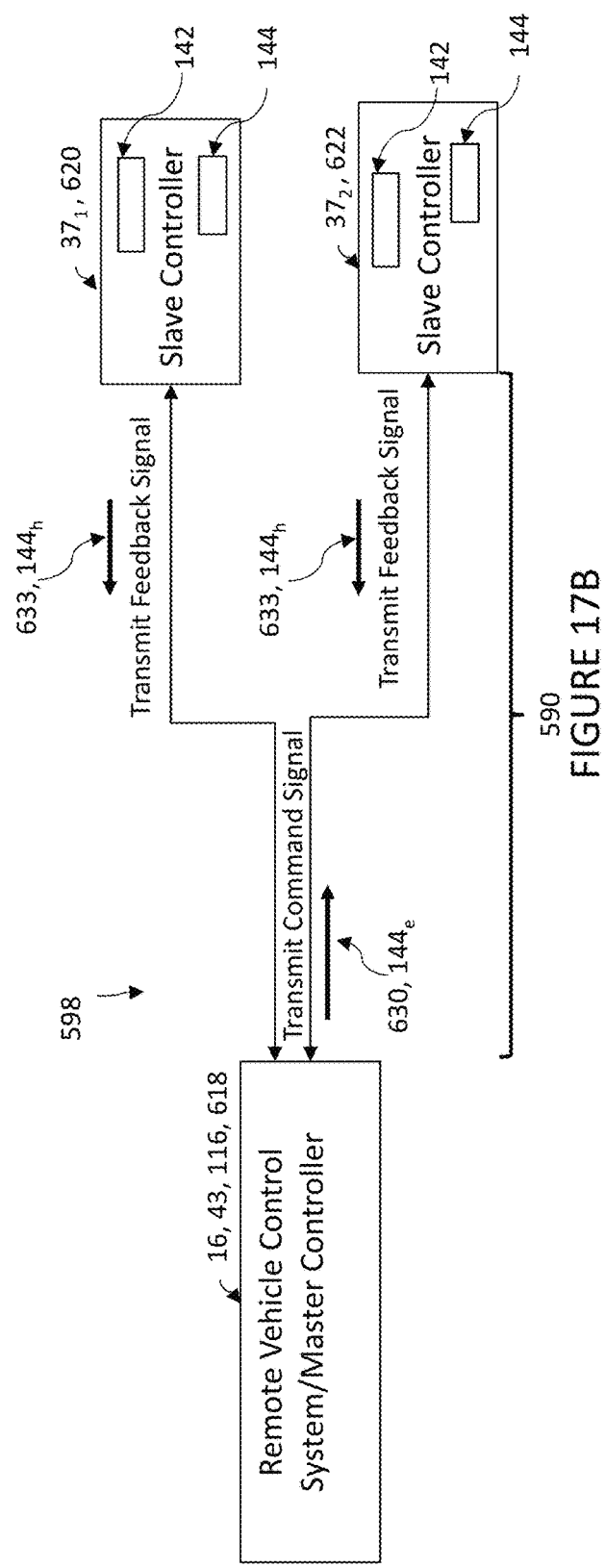

INTEGRATED CONTROLLER WITH SENSORS FOR ELECTROMECHANICAL BIASING MEMBER

CROSS-REFERENCE TO RELATED APPLICATION

This application is a continuation application of U.S. patent application Ser. No. 15/991,289 filed May 29, 2018 which claims the benefit of U.S. Provisional Application Serial No. U.S. 62/512,468, filed May 30, 2017, and U.S. Provisional Application Ser. No. 62/645,282, filed Mar. 20, 2018 which are incorporated herein by reference in their entirety.

FIELD

The present invention relates to electromechanical members for closure panels of a vehicle. In particular, the present invention relates to electromechanical members having integrated electric motors and controller components.

BACKGROUND

Vehicles are equipped with a variety of closure panel, such as a lift gate, which is driven between an open position (position 2) and a closed position (position 1) using an electric drive system. Vehicle closure panels can employ struts to assist the vehicle operator to open the closure panel, close the closure panel, and help maintain the closure panel in the open position or in an intermediate hold position (third position hold). Typically, the struts can be biased and can also be automatically controlled via an electric motor of the electric drive system. These struts are important in terms of both convenience and safety, because without them, vehicle operators can risk injury when entering or exiting the vehicle via the closure panel, e.g. when loading or unloading the vehicle.

Therefore, it is desirable to employ motorized struts with vehicle closure panels for ease of operation. However, available space is typically limited in the vicinity of strut mounting on the vehicle frame. Current motorized strut designs utilize motors and/or motor controllers mounted on the exterior of the strut housing which may increase or alter the strut outer envelope, which is problematic due to space constraints. Further, current designs can also position motor controllers remote from the electric motors (distanced from the strut housing) in order to address the space constraints. However, remote placement of the motor controllers is also problematic due to signal noise considerations for position/obstacle sensing during operation of the strut and motor electric drive system.

SUMMARY

With respect to at least one of the above presented disadvantages, it is an advantage of the present invention to position electronic control circuitry and corresponding motor internal to a housing of an electromechanical basing member. Internal positioning can facilitate a reduction in packaging space requirements for the electromechanical biasing member, as compared to externally mounted control circuitry, and/or provide for desired sensing signal reception and processing quality.

A first aspect provided is an electromechanical biasing member for moving a closure panel between an open position and a closed position relative to a motor vehicle body, the electromechanical biasing member comprising: a housing comprising an inner cavity, the housing for connecting to one of the closure panel and the motor vehicle body; an electric motor positioned within the inner cavity, the electric motor comprising a motor shaft; a rotary output member within the housing and operatively coupled to the motor shaft, the rotary output member rotatable relative to the housing in response to a rotation of the motor shaft; an extension member within the housing and engageable with the rotary output member and for connecting to the other one of the closure panel and the motor vehicle body, the extension member configured to translate a rotation of the rotary output member into a linear motion of the extension member relative to the housing to move the closure panel between the open position and the closed position; and a control unit positioned within the inner cavity and configured to drive the electric motor, the control unit comprising: at least one controller board juxtaposed to the electric motor; at least one computing device mounted to the at least one controller board and configured to execute instructions to generate a control command to drive the electric motor, the at least one computing device comprising at least a data processor and a memory storing the instructions, the memory being coupled to the data processor; and a plurality of control components mounted to the at least one controller board the plurality of control components configured to supply a drive signal based on the control command to the electric motor and receive signals representative of operation of the electric motor.

A further aspect provided is a method for operating an electromechanical biasing member for moving a closure panel between an open position and a closed position relative to a motor vehicle body, the electromechanical biasing member having both an electric motor comprising a motor shaft and a control unit positioned adjacent to one another within an inner cavity of a housing of the electromechanical biasing member, the control unit configured to drive the electric motor, the method comprising the steps of: receiving a command signal by the control unit, the control unit having at least one controller board juxtaposed to the electric motor; processing the command signal by at least one computing device mounted to the at least one controller board to generate an actuation signal to drive the electric motor, the at least one computing device comprising at least a data processor and a memory storing the instructions, the memory being coupled to the data processor; and sending by the control unit the actuation signal to the electric motor; wherein the at least one controller board has a plurality of control components mounted thereto, the plurality of control components configured to send the actuation signal and to receive a signal representative of operation of the electric motor.

A still further aspect provided is where a plurality of control components for an electromechanical biasing member further comprise one or more sensors mounted to at least one controller board, wherein the one or more sensors comprise at least one sensor configured to detect at least one of the rotation of the motor shaft and the rotation of the rotary output member.

A still further aspect provided is a control system controlling the operation of an electromechanical strut for moving a closure panel between an open position and a closed position relative to a motor vehicle body, the electromechanical strut comprising a housing comprising an inner cavity, and an electric motor positioned within the inner cavity, the control system comprising: a module associated with a vehicle latch, the module comprising a master controller configured to issue commands to move the closure panel between an open position and a closed position; and a slave controller remote from and in communication with the master controller to receive the commands, the slave controller comprising: a control unit positioned within the inner cavity and configured to drive the electric motor, the controller comprising: at least one controller board juxtaposed to the electric motor; at least one computing device mounted to the at least one controller board and configured to execute instructions to generate a control command to drive the electric motor, the at least one computing device comprising at least a data processor and a memory storing the instructions, the memory being coupled to the data processor; and a plurality of control components mounted to the at least one controller board and configured to supply a drive signal based on the control command to the electric motor and receive signals representative of an electric motor operation.

BRIEF DESCRIPTION OF THE DRAWINGS

Reference is made, by way of example only, to the attached figures, wherein:

FIG. 17A is a system level block diagram of an example operation of a distributed control system provided with two electromechanical biasing members one of which is operating as a master controller and the other as slave controller;

FIG. 17B is a system level block diagram of an example operation of a distributed control system provided with two electromechanical biasing members operating as slave controllers to a vehicle system operating as a master controller;

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

In the following description, details are set forth to provide an understanding of the disclosure. In some instances, certain software, circuits, structures, techniques and methods have not been described or shown in detail in order not to obscure the disclosure. The term "control unit" is used herein to refer to any machine for processing data, including the data processing systems, computer systems, modules, electronic control units ("ECUs"), controllers, microprocessors or the like for providing control of the systems described herein, which may include hardware components and/or software components for performing the processing to provide the control of the systems described herein. A computing device is another term used herein to refer to any machine for processing data including microprocessors or the like for providing control of the systems described herein. The present disclosure may be implemented in any computer programming language (e.g. control logic) provided that the operating system of the control unit provides the facilities that may support the requirements of the present disclosure. Any limitations presented would be a result of a particular type of operating system or computer programming language and would not be a limitation of the present disclosure. The present disclosure may also be implemented in hardware or in a combination of hardware and software.

Figure 1:
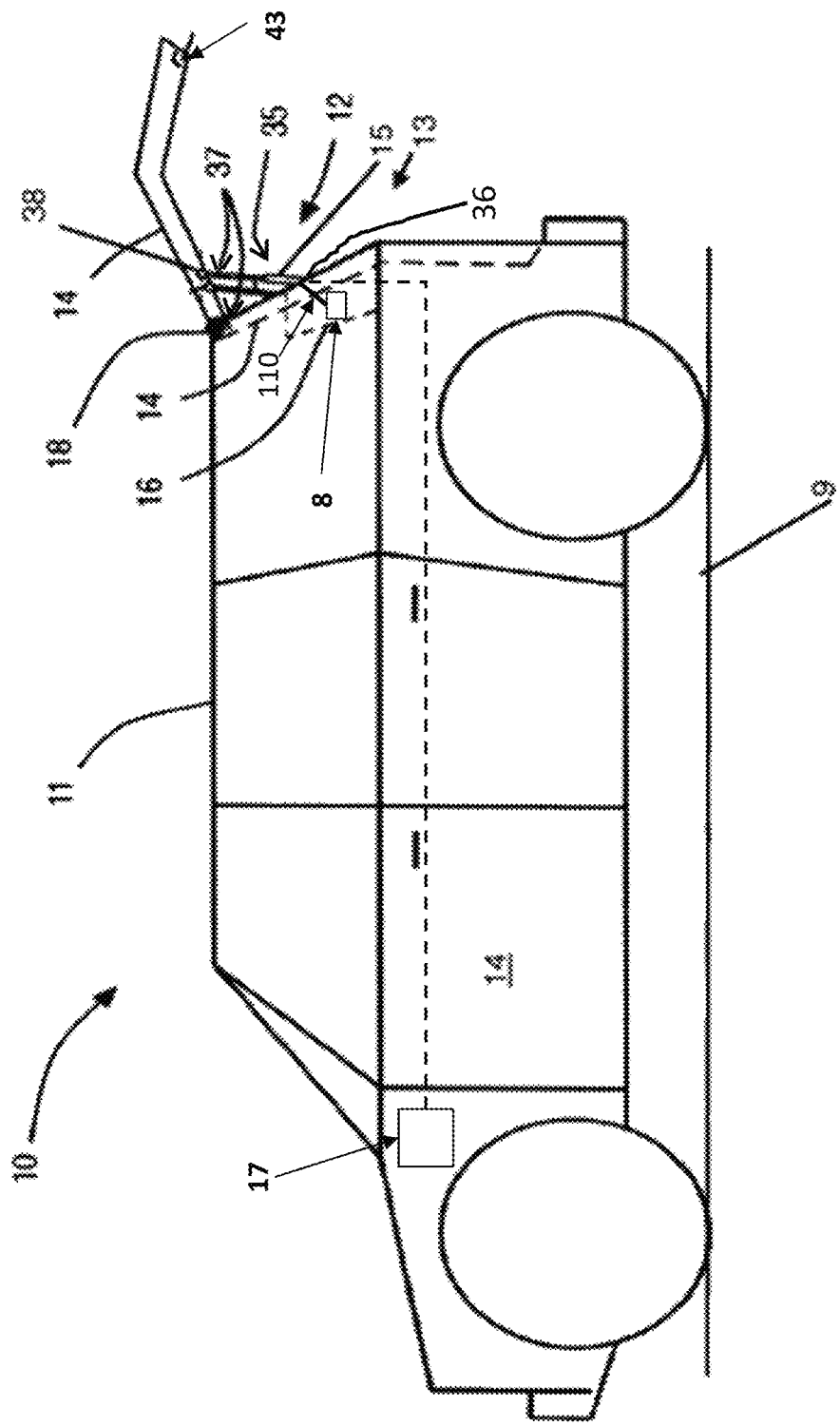
FIG. 1 is a side view of a vehicle with a closure panel assembly.
Figure 4:
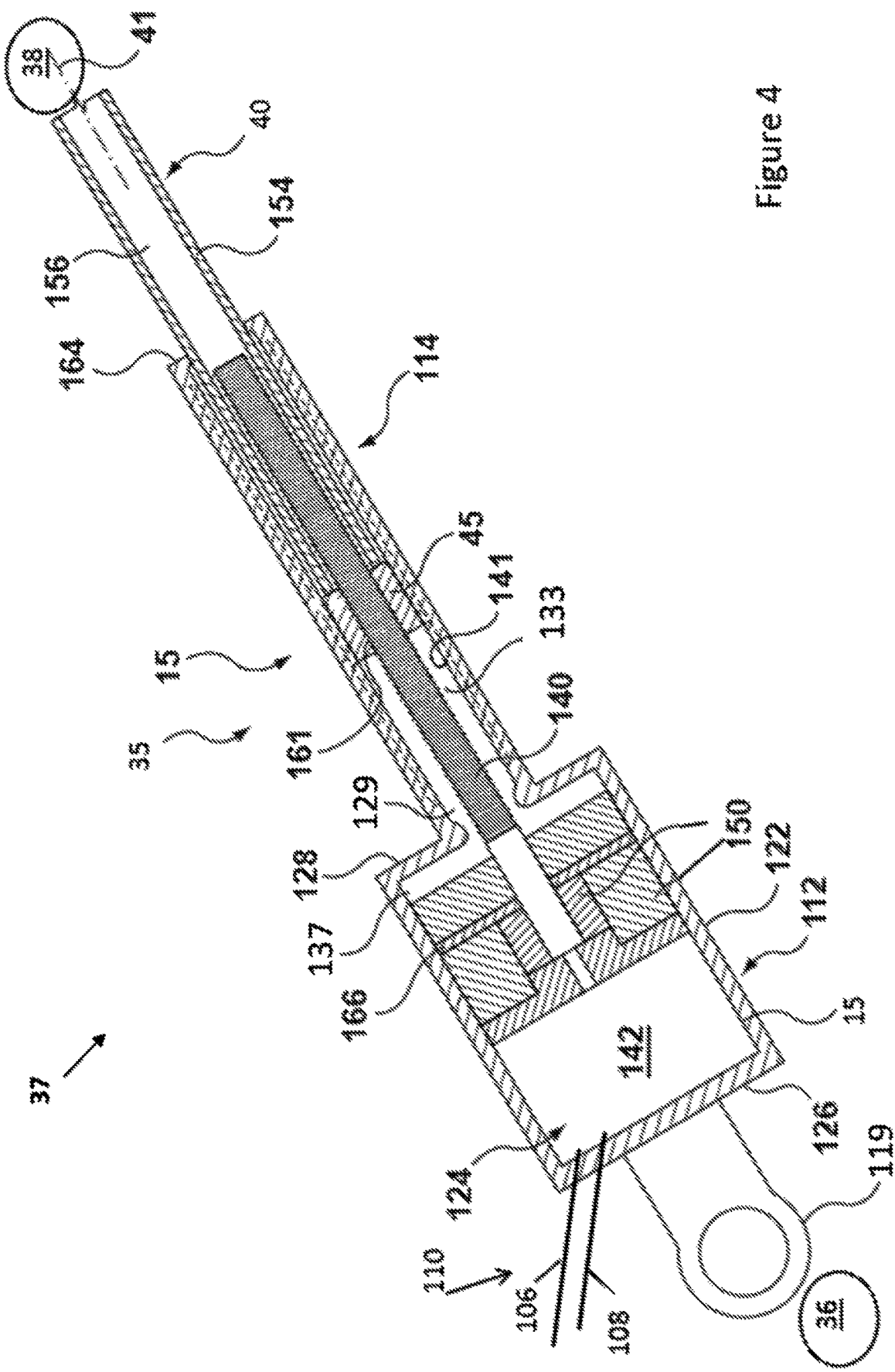
FIG. 4 is a further embodiment of the biasing member of FIG. 3 as an electromechanical biasing member with an electronic motor assembly.

Referring to FIGS. 1 and 4, an electronic motor assembly 15 is integrated within a housing 35 of an electromechanical biasing member 37 such as a spring loaded strut, for example provided as a component of a closure panel assembly 12, as further described below. The housing 35 also contains an extension member 40 used to extend from, or retract within, the housing 35 to effect the resulting location of the closure panel 14 with respect to a vehicle body 11 of the vehicle 10. For example, an extended extension member 40 results in positioning the closure panel 14 in an open state, while a retracted extension member 40 results in positioning the closure panel 14 in a closed state with respect to opening 13. It is recognized that the electromechanical biasing member 37, incorporating the electronic motor assembly 15, can be implemented as a strut (see FIG. 4 as an example type of struts). The strut can be of a biasing type (e.g. spring and/or gas charge supplying the bias). As such, via the incorporation of the electronic motor assembly 15, the strut is an electromechanical system, driven by the electronic motor assembly 15 with optionally spring and/or gas charge supplying the bias.

Figure 2:
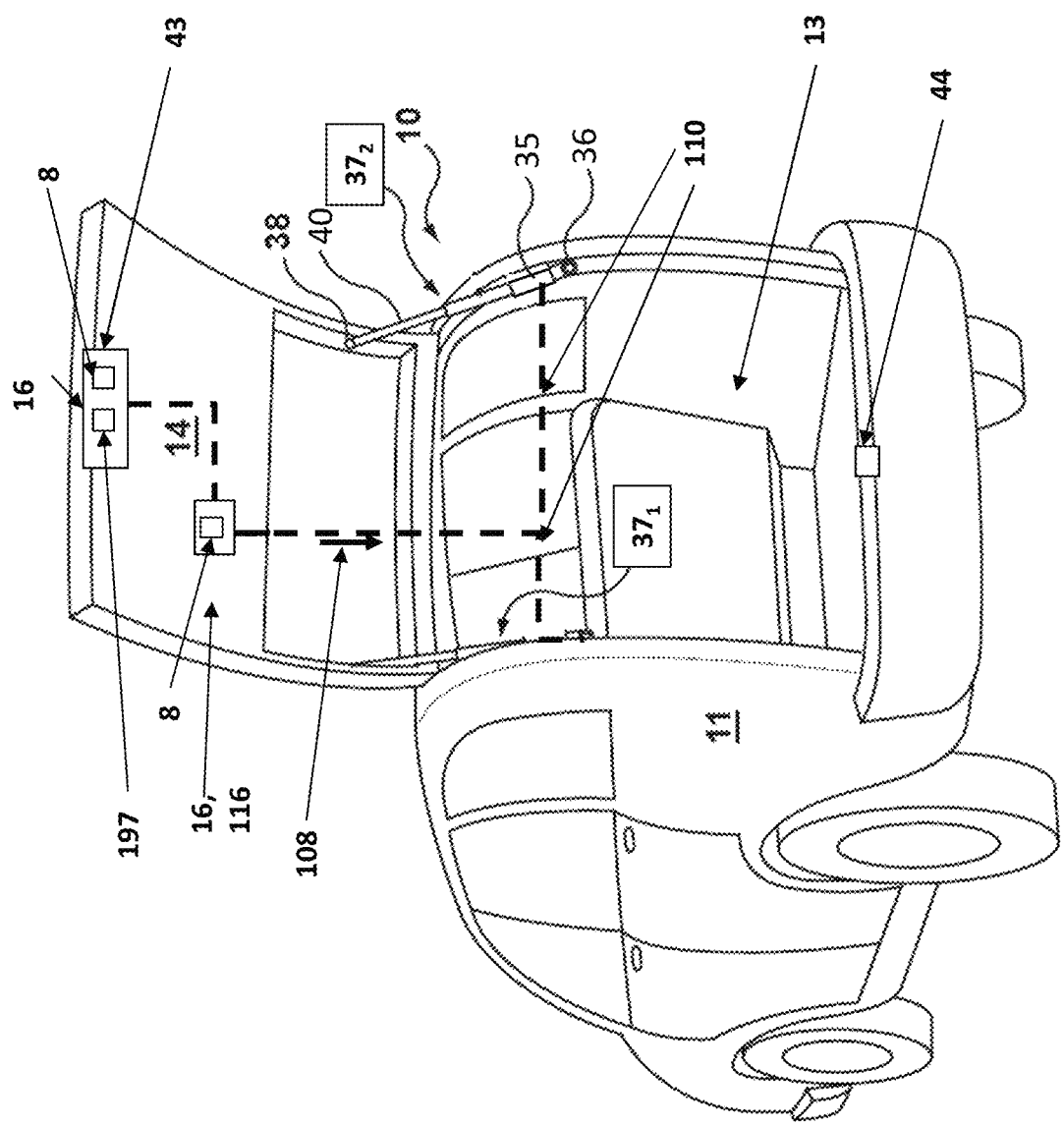
FIG. 2 is a further embodiment of the vehicle of FIG. 1.

Referring to FIGS. 1 and 2, shown is the vehicle 10 with the vehicle body 11 having one or more closure panels 14. One example configuration of the closure panel 14 is a closure panel assembly 12 including electronic motor assembly 15 (e.g. incorporated in a electromechanical biasing member 37 embodied as a strut by example) and one or more vehicle control systems 16, such as a Body Control Module (BCM), a latch control module 116, a smart latch 43, or other vehicle control system which are mounted in other locations on the vehicle body 11 (i.e. spaced apart and external/remote from the electronic motor assembly 15) and/or within the closure panel 14, and are coupled to the electronic motor assembly 15 via a communication path illustratively established over electrical connection(s) 110 (e.g. wired and/or wireless communication—see FIGS. 2 and 4). For example, the electrical connection(s) 110 can be used to supply operating power to the electronic motor assembly 15, which may be illustratively provided from a main vehicle power source 17, such as the vehicle main battery, or other power source and/or backup energy source. For example, the electrical connection(s) 110 can be used to facilitate data and/or command signal communication between a signal source 8 (e.g. located remote to the housing 35 such as but not limited to the vehicle control system 16) and the electronic motor assembly 15. For example, the electrical connection(s) 110 can be used to supply both operating power to the electronic motor assembly 15 as well as facilitating data and/or command signal communication between the signal source 8 (located remote to the housing 35) and the electronic motor assembly 15. For example, the electrical connector(s) 110 can be configured to communicate signals associated with Local Interconnect Network protocol signals, power supply signals, and electrical ground signals. It is recognized that a battery or other type of backup power source (not shown) can be housed in the housing 35 in applications where the housing 35 footprint (e.g. dead length) is not a limiting constraint, and thus used to supply power to the electronic motor assembly 15, such that the electrical connection(s) 110 can be used to charge the battery periodically. In one embodiment, the electrical connection(s) 110 can be used to supply both power and data/command signaling. In a further embodiment, the electrical connection(s) 110 can be used to supply power while data/command signaling is provided via wireless communication.

For vehicles 10, the closure panel 14 can be referred to as a partition or door, typically hinged, but sometimes attached by other mechanisms such as tracks, in front of the opening 13 which is used for entering and exiting the vehicle 10 interior by people and/or cargo. It is also recognized that the closure panel 14 can be used as an access panel for vehicle 10 systems such as engine compartments and also for traditional trunk compartments of automotive type vehicles 10. The closure panel 14 can be opened to provide access to the opening 13, or closed to secure or otherwise restrict access to the opening 13. It is also recognized that there can be one or more intermediate hold positions of the closure panel 14 between a fully opened position and fully closed position, which can be facilitated by operation of the electronic motor assembly 15. For example, the electronic motor assembly 15 can assist in movement of the closure panel 14 to/away from one or more intermediate hold position(s), also known as Third Position Hold(s) (TPHs) or Stop-N-Hold(s), once positioned therein. The electronic motor assembly 15 can assist with the opening and closing of the closure panel 14 in a desired manner, such as based upon a desired speed of movement, the desired third position holds, the desired anti-pinch functionality whereby the movement of the closure panel 14 is stopped from closing to avoid objects, obstacles, and limb members (e.g. fingers) from being pinched between the closure panel 14 and the vehicle body 11, and the desired obstacle detection functionality whereby the closure panel 14 is stopped to avoid obstacles and objects from being impacted by the moving closure panel 14.

In terms of vehicles 10, the closure panel 14 can be a lift gate as shown in FIG. 1, or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to laterally swing (or slide) away from (or towards) the opening 13 in the vehicle body 11 of the vehicle 10. Also contemplated are sliding door embodiments of the closure panel 14 and canopy door embodiments of the closure panel 14, such that sliding doors can be a type of door that opens by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 10 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the vehicle body 11 of the vehicle 10 at the front, side or back of the door, as the application permits.

Referring again to FIG. 1, in the context of a vehicle application of a closure panel 14 by example only, the closure panel 14 is movable between a closed position (shown in dashed outline) and an open position (shown in solid outline). In the embodiment shown, the closure panel 14 pivots between the open position and the closed position about a pivot axis 18, which is preferably configured as horizontal or otherwise parallel to a support surface 9 of the vehicle 10. In other embodiments, the pivot axis 18 can have some other orientation such as vertical or otherwise extending at an angle outwards with respect to the support surface 9 of the vehicle 10. In still other embodiments, the closure panel 14 can move in a manner other than pivoting, for example, the closure panel 14 can translate along a predefined track or can undergo a combination of translation and rotation between the opened and closed positions.

Referring again to FIG. 1, exemplary embodiments of the electronic motor assembly 15 (provided below) for the closure panel assembly 12 can be used as the means of open and close assistance for the closure panels 14 themselves (see FIG. 2), or can be used in combination (e.g. in tandem or otherwise integrated) with one or more other closure panel biasing members 37 (e.g. spring loaded hinges, struts such as gas struts or spring loaded struts, etc.) that provide a primary connection of the closure panel 14 to the vehicle body 11 at a pivot connection 36 (see FIG. 1). In general configuration of the closure panel assembly 12, the electronic motor assembly 15 can be incorporated within a housing 35 (also referred to as lever mechanism or arm or element) used to connect the closure panel 14 as a secondary connection of the closure panel 14 to the vehicle body 11, such that the extension member 40 and the housing 35 (of the closure panel electromechanical biasing member 37) can be pivotally attached to the closure panel 14 at spaced apart pivot connections 36, 38 as shown. In this manner, the end of the housing 35 pivotally connects to the closure panel 14 at pivot connection 38. It is recognized that the housing 35 itself can be configured to contain a non-biasing element (e.g. a solid extension rod 40) or can be configured to contain a biasing element (e.g. a gas or spring assisted extension strut containing biasing element(s)) along with the extension member 40, as desired.

Referring again to FIG. 1, one or more optional closure panel biasing members 37 can be provided which urge the closure panel 14 towards the open position throughout at least some portion of the path between the opened position and the closed position and which assist in holding the closure panel 14 in the opened position. The closure panel biasing members 37 can be, for example, gas extension struts which are pivotally connected at their proximal end to the closure panel 14 and at their distal end to the vehicle body 11. In the embodiment shown in FIG. 2, there are two biasing members 37 (one on the left side (i.e. closure panel biasing member $37_1$) of the vehicle 10 and one on the right side (i.e. closure panel biasing member $37_2$) of the vehicle 10), such that the closure panel assembly 12 includes the closure panel 14 and a pair of biasing members 37 acting to control the movement of the closure panel 14. It is recognized that one or both of the biasing members 37 can incorporate the electronic motor assembly 15 within the housing 35, i.e. thus configured as the electromechanical biasing member 37. In one example, see FIG. 4, the electronic motor assembly 15 is incorporated within the electromechanical biasing member 37 in order to provide a motorized version, such that the extension member 40 is actively driven by the electronic motor assembly 15 via a lead screw 140, or drive screw 140. The second biasing member $37_2$ is positioned at another side of the closure panel 14, as a same or differently configured biasing member $37_1$. In the embodiment as a differently configured biasing member $37_2$, the housing 35 does not contain (see FIG. 3) any electronic motor assembly 15 and as such this biasing member $37_2$ would be passively operated by motion of the closure panel 14. In either configuration, it is recognized that during operation of the biasing member(s) 37, the extension member 40 is either extended from, or retracted into, the housing 35.

The closure panel 14 can be opened by being powered electronically via the electronic motor assembly 15, for example in cooperation with one or more vehicle control systems 16, where powered closure panels 14 can be found on minivans, high-end cars, or sport utility vehicles (SUVs) and the like. Additionally, one characteristic of the closure panel 14 is that due to the weight of materials used in manufacture of the closure panel 14, some form of force assisted open and close mechanism (or mechanisms) are used to facilitate operation of the open and close operation by an operator (e.g. vehicle driver) of the closure panel 14. The force assisted open and close mechanism(s) is/are provided by the electronic motor assembly 15, any biasing member(s) 37 (e.g. spring loaded hinges, spring loaded struts, gas loaded struts, electromechanical struts, etc.) when used as part of the closure panel assembly 12.

It is recognized that the electromechanical biasing member 37 can have a lead screw 140 (e.g. rotary output member—see FIG. 4) operated actively (i.e. driven) by a motor 142 (e.g. an electrical, brushed or brushless, motor, such as a direct current (DC) electric motor) or operated passively such that the lead screw 140 is free to rotate about its longitudinal axis but is not actively driven by a motor 142 (e.g. in the event of electrical system failure of the vehicle 10) of the electronic motor assembly 15. It is recognized that the electronic motor assembly 15 is configured as an internal component of the electromechanical biasing member 37 (e.g. incorporated as a component positioned wholly within the housing 35), as further provided below. The springs 66, 68 may provide a counterbalance force to the weight of the closure panel 14 to assist with the movement of the closure panel 14.

Figure 3:
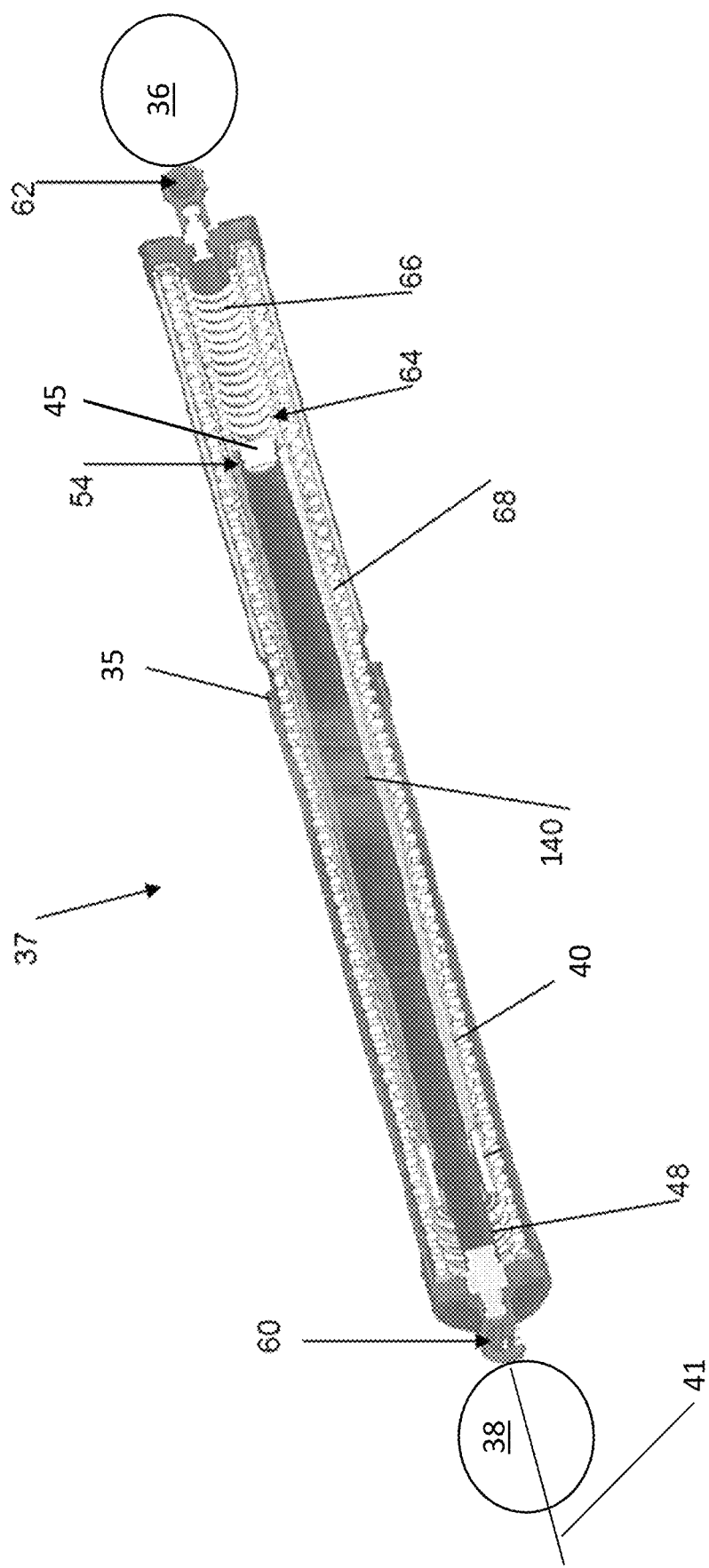
FIG. 3 is an example biasing member as a closure panel strut of the closure panel assembly of FIG. 1.

Referring to FIG. 3, shown is a biasing member 37 (non-motorized) referred to as a biasing strut with the housing 35 (e.g. a body) having a first end 60 for connecting to the closure panel 14 (or a vehicle body/frame 11) and a second end 62 for connecting to the vehicle body/frame 11 (or the closure panel 14), depending upon the configuration orientation of the biasing member 37 when installed in the closure panel assembly 12 (see FIG. 1). In this configuration, the biasing member 37, by example only, has the extension member 40 (e.g. a stator member, such as a linear drive nut 45, slideably engageable with the rotary output member such as via a mated threads) positioned in an interior 64 of the housing 35. A distal end 54 of the extension member 40 is coupled to the second end 62 (for example via an optional element 66—spring) of the biasing member 37 (e.g. strut) and the proximal end 48 of the extension member 40 is coupled to the first end 60. The extension member 40 is coupled to the lead screw 140 via the travel member 45 (for example as an integral part of or separate to the extension member 40), such that rotation of the lead screw 140 causes travel of the travel member 45 along the lead screw 140, to result in extension or retraction of the extension member 40 with respect to the housing 35. As discussed in relation to FIG. 4, the travel member 45 and the lead screw 140 are coupled to one another via mated threads. As shown, the electromechanical biasing member 37 can be a strut having a resilient element of the power spring 68 for providing the counterbalance torque (T) during operation of the closure panel 14 in moving between the opened and closed positions (see FIG. 1).

Referring again to FIG. 3, the travel member 45 is positioned at one end of the extension member 40. The extension member 40 is coupled (in this example case via a mounted kicker spring 66) to the closure panel 14 (see FIG. 1) or the vehicle body 11 at the distal end 54. Complimentary, the extension member 40 is coupled to the vehicle body 11 or the closure panel 14 at the proximal end 48. As such, as the extension member 40 is displaced along the longitudinal axis 41, the attached travel member 45 is displaced along the lead screw 140. As such, as the closure panel 14 is moved between the opened and closed positions (see FIG. 1), the position of the travel member 45 along the lead screw 140 varies, thereby providing for reciprocation of the travel member 45 along the longitudinal axis 41 of the lead screw 140.

Referring now to FIG. 4, an embodiment of the electromechanical biasing member 37 containing the electronic motor assembly 15 for the vehicle 10 is shown. The electromechanical biasing member 37 includes the housing 35 having a lower housing 112 for containing the electronic motor assembly 15 and an upper housing 114 for containing the extension member 40 (e.g. extension shaft/rod). It is recognized that preferably the lower housing 112 and upper housing 114 are of similar lateral (e.g. diameter) dimension provided along its longitudinal length, however the housings 112,114 are shown in FIG. 4 with differing dimensions for exemplary purposes. A second pivot mount (not shown) is attached to the distal end of extension member 40, relative to upper housing 114, and can be pivotally mounted to the lift gate 14 of the vehicle 10. As described below, the electronic motor assembly 15 is contained wholly within the confines of the housing 35 of the electromechanical biasing member 37, and is thus supplied with power/data/command signals via the electrical connections 110 configured to penetrated the housing 35 through a sealed housing 35 end wall or other port (see FIG. 5). In particular, both electronic control circuitry (e.g. ECU 144) for the motor 142, and the motor 142 itself, are mounted within the interior of the housing 35 without increasing the dimensions of the housing 35.

The interior of the lower housing 112 is now described in greater detail, by example. Lower housing 112 provides a (e.g. cylindrical or tubular) sidewall 122 defining a chamber 124, or cavity. Pivot mount 121 is attached to an end wall 126 of lower housing 112 proximal to the vehicle body 11. Upper housing 114 provides a (e.g. cylindrical or tubular) sidewall 141 defining a chamber 133 that is open at both ends. A distal end wall 128 of lower housing 112 includes an aperture 129 so that chamber 124 and chamber 133 communicate with each other. Upper housing 114 can have a smaller diameter than lower housing 112. However, it is contemplated that lower housing 112 and upper housing 114 can also be formed as a single cylinder or frusto-cone. Other form factors for lower housing 112 and upper housing 114 will occur to those of skill in the art. Upper housing 114 can be integrally formed with lower housing 112, or it can be secured to lower housing 112 through conventional means (threaded couplings, weld joints, etc). An electronic motor assembly 15 is seated in chamber 124 and is an integral component of the electromechanical strut 37 (e.g. situated internally in the housings 112, 114 as shown rather than situated external to the housings 112,114 as contemplated by existing state of the art designs). For example, the housing 35 can comprise one or more sections (e.g. lower housing 112, upper housing 114) having a cross sectional shape of circular, of rectilinear (e.g. square), etc.

The electronic motor assembly 15 can include a motor 142 (e.g. a brushless electric motor, or a brushed electric motor), a clutch and planetary gearbox 150, and a lead screw 140 (or referred to as a drive screw 140 or rotary output member powered by rotary motion of the motor 142) which can be used to transport or otherwise guide a travel member 45 (connected to the extension member 40) along the longitudinal axis 41 of the electromechanical biasing member 37. Motor 142 is mounted within chamber 124 adjacent to end wall 126. Motor 142 can be a direct current bi-directional motor. Electrical power signal line 106 and/or direction control (i.e. command control signal line 108) for motor 142 can be provided via the electrical connections (e.g. cables or wires) 110 that connect into the electromechanical biasing member 37 through apertures or ports into the interior of the housing 35 (e.g. in end wall 126), and are otherwise connected to operator handles, a vehicle latch, such as latch 43, buttons and/or other vehicle control systems 16 (e.g. a potential source of the power and/or data/command signal(s)), as desired. It is recognized that the electrical connection(s) 110 can be an example of an electrical connector that penetrates the housing 35 to provide electrical communication with a computing device, such as an ECU 144 from and/or to the source 8 (e.g. vehicle control system 16, handle, latch, button, etc.) positioned external and remote to the housing 35.

The clutch and planetary gearbox 150 are connected to an output shaft on motor 142. The clutch and planetary gearbox 150 can provide a selective engagement between the output shaft of motor 142 and the clutch and planetary gearbox 150. The clutch and planetary gearbox 150 can be an electromechanical tooth clutch that engages planetary gearbox when motor 142 is activated, for example. When the clutch and planetary gearbox 150 are engaged, torque is transferred from motor 142 through to the planetary gearbox 150. When clutch is disengaged, torque is not transferred between motor 142 and planetary gearbox so that occurrence of back drive of the motor 142 can be limited if the closure panel 14 is closed manually. For example, the planetary gearbox 150 can be a two-stage planetary gear that provides torque multiplication for lead screw 140. Lead screw 140 extends into upper housing 114. As such it is recognized that in the case where the electronic motor assembly 15 is present, the lead screw 140 can be driven, i.e. actively rotated by the rotary motion of the electronic motor assembly 15 coupled to the lead screw 140 via the travel member 45. For example, the travel member 45 contains an internally facing series of threads in bore 161 that are mated to an externally facing series of threads on the extension member 40, as desired. Alternatively, in the case where the electronic motor assembly 15 is not present/engaged, the lead screw 140 can rotate about the longitudinal axis 41 under the influence of friction present between the travel member 45 and the lead screw 140 in the bore 161, i.e. passively rotated by the linear motion of the travel member 45 as it rotates about the lead screw 140.

Extension member 40 resides within a (e.g. cylindrical or tubular) sidewall 154 of the housing 35 defining a chamber 156 and can be concentrically mounted between upper housing 114 and lead screw 140. As described earlier, pivot mount 38 is attached to the distal end of extension member 40. The proximal end of extension member 40 can be open. A nut 45 (also referred to as the travel member 45) is mounted around the proximal end of extension member 40 relative to lower housing 112 and is coupled with lead screw 140 in order to convert the rotational movement of lead screw 140 into the linear motion of the extension member 40 along the longitudinal axis 41 of lead screw 140. The nut 45 can include splines that extend into opposing coaxial slots provided on the inside of upper housing 114 to inhibit nut 45 from rotating as the nut 45 travels along the longitudinal axis 41. Alternatively, the nut 45 may be configured without the splines and thus be free to rotate as the nut 45 travels along the longitudinal axis 41, without departing from the scope of the description. An integrally-formed outer lip 164 in upper housing 114 can provide an environmental seal between the chamber 133 and the outside.

A spring housing 137 can be provided in lower housing 112 and defined by a sidewall 122, end wall 128, and a flange 166. Within spring housing 137, a power spring (not shown in FIG. 4) similar to the power spring 68 as seen in FIG. 3 can be optionally coiled around lead screw 140, providing a mechanical counterbalance to the weight of the lift gate 14. Preferably formed from a strip of steel, power spring 68 assists in raising the lift gate 14 both in its powered and un-powered modes of the electromechanical strut 37 and alleviates the loading on the motor 142 due to the weight of the closure panel 14. One end of power spring 68 is positioned or otherwise attached to the travel member 45 and the other is secured to a portion of the sidewall 122. When extension member 40 is in its retracted position, power spring 68 is tightly coiled around lead screw 140 and therefore applies bias against the travel member 45. As lead screw 140 rotates to extend extension member 40, in concert with travel of the travel member 45 along the upper housing 114, power spring 68 uncoils, releasing its stored energy and transmitting an axial force through extension member 40 to help raise the lift gate 14. When power screw 140 rotates to retract extension member 40, in concert with travel of the travel member 45 along the upper housing 114, the power spring 68 recharges by recoiling around lead screw 140. It is recognized that other forms of counterbalance assist configurations may be provided for assisting with the movement of the closure panel 14 by the electronic motor assembly 15 (e.g. alleviating the strain and loading due to the weight of the closure panel 14 placed upon the motor 142).

As such, in view of the above, the integrated electronic motor assembly 15 can be incorporated into a number of different electromechanical biasing member 37 form factors. One example is the strut with lead screw 140 such that the travel member 45 only travels linearly along the longitudinal axis 41. Another example is the strut with lead screw 140 such that the travel member 45 travels both linearly along the longitudinal axis 41 and rotationally about the longitudinal axis 41 (i.e. helical relative motion).

Figure 5:
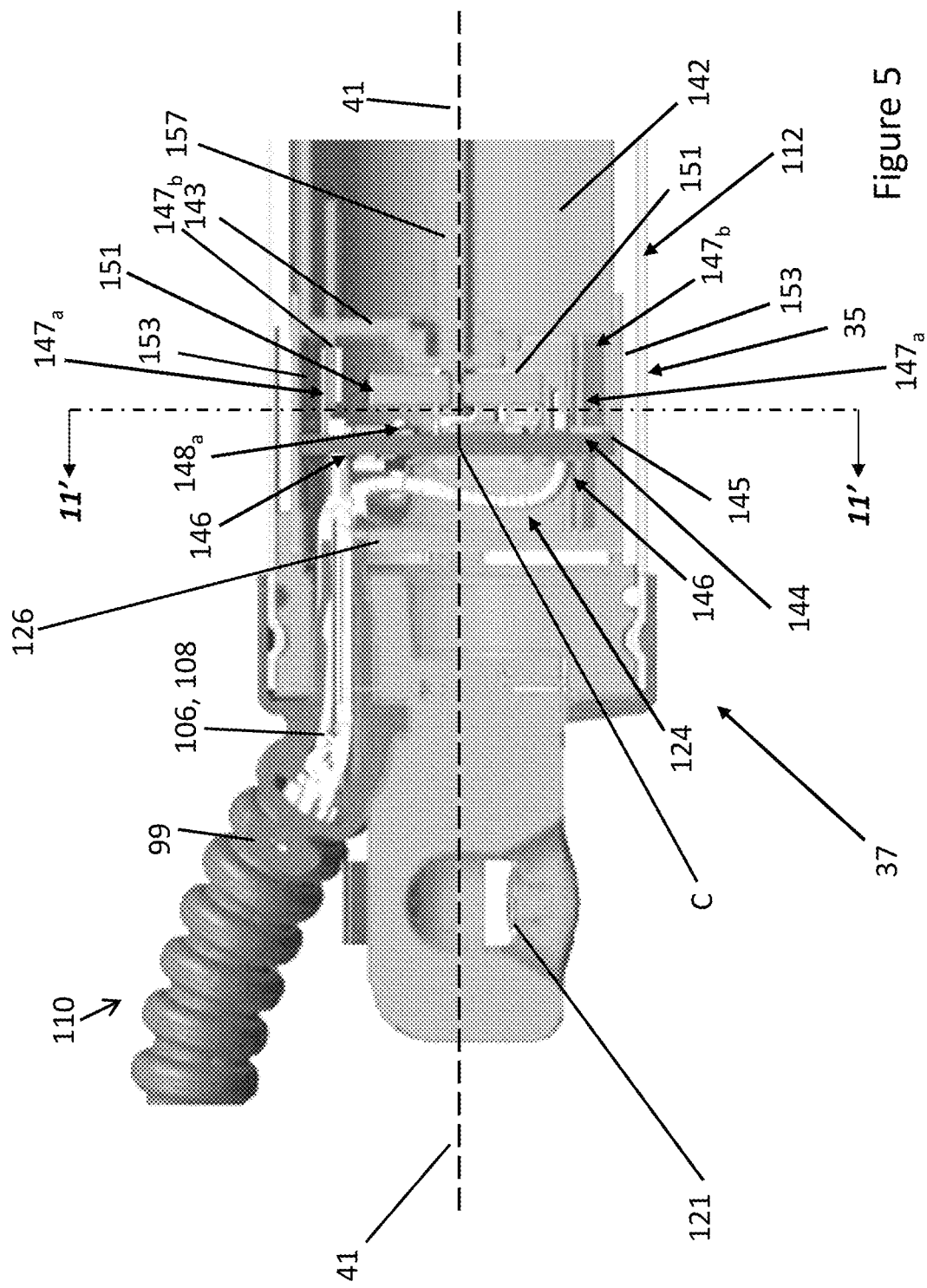
FIG. 5 is a partial cross sectional view of an embodiment of the electromechanical biasing member of FIG. 4.
Figure 11:
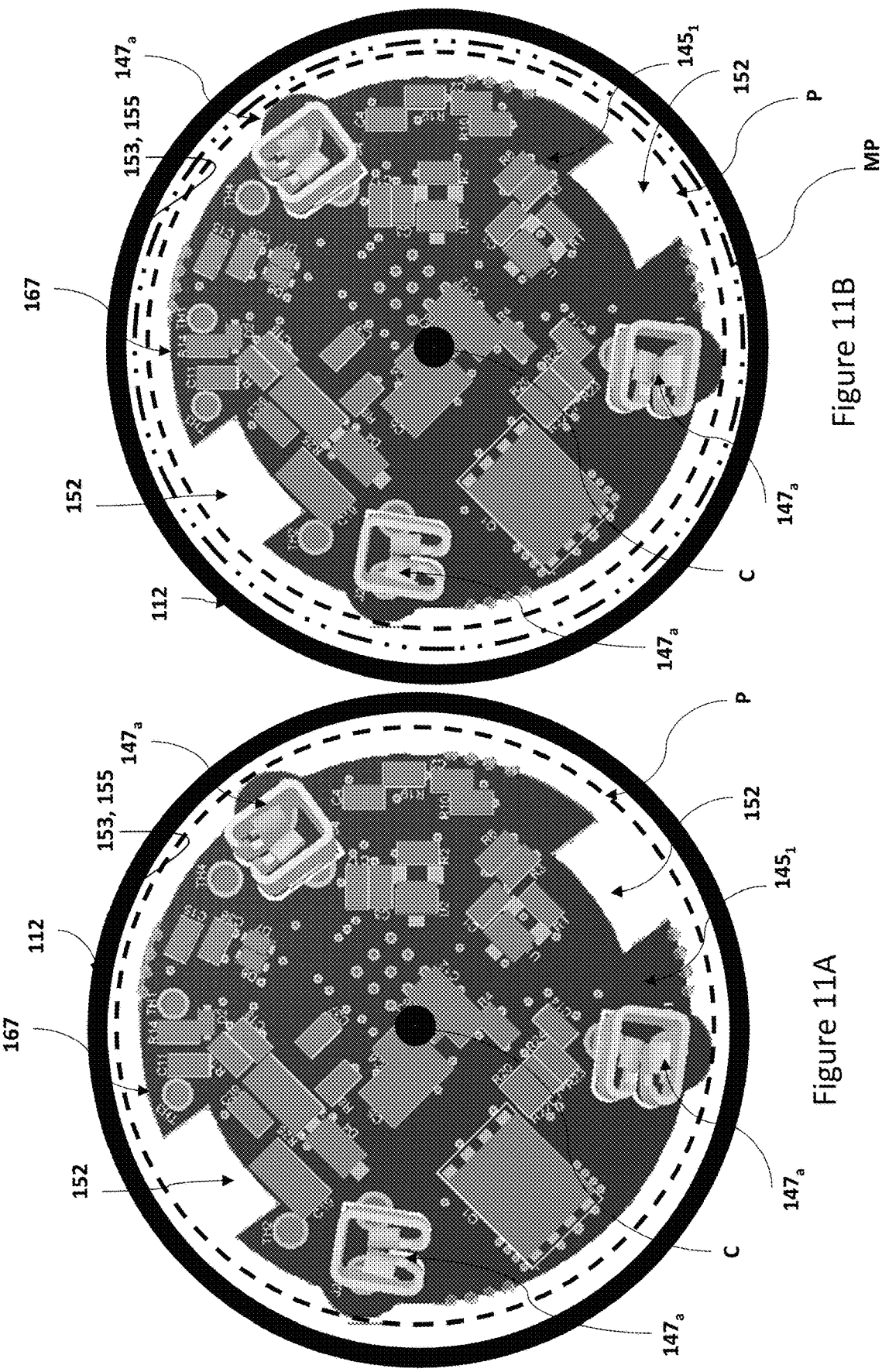
FIGS. 11A and 11B are cross-sectional views of the electromechanical biasing member of FIG. 5, taken along the line 11'-11'.

Referring to FIG. 5, shown is the electromechanical biasing member 37 with the electronic motor assembly 15 mounted in the interior of the housing 35, such that the electronic motor assembly 15 contains the motor 142 and a computing device, such as Electronic Control Unit (ECU) 144 for controlling operation of the motor 142, i.e. both the motor 142 and the ECU 144 are mounted within the housing 35 containing the lead screw 140 and corresponding extension member 40 (see FIG. 4). It is recognized that both the motor 142 and the ECU 144 are mounted along the longitudinal axis 41 of the electromechanical biasing member 37, while at the same time having the physical dimensional extents of the ECU 144 contained between interior surfaces of the housing 35, as illustrated in FIG. 11. For example, as shown in FIG. 5, the motor 142 is within the housing 35 and adjacent to the lead screw 140 (see FIG. 4), so as to affect rotation of the lead screw 140 as directed by the ECU 144. Further, the ECU 144 is mounted adjacent to the motor 142 and as well within the interior surface of the housing 35 (e.g. within cavity 124). As shown in FIG. 4, the electronic motor assembly 15 is positioned in the lower housing 112 portion along with the ECU 144, while the lead screw 140 and extension member 40 are positioned in the upper housing 114 portion. As further discussed below, the ECU 144 can be configured to function as a master controller, or as a slave controller to a master controller located externally to the housing 35 (see FIGS. 17-23).

Figure 12:
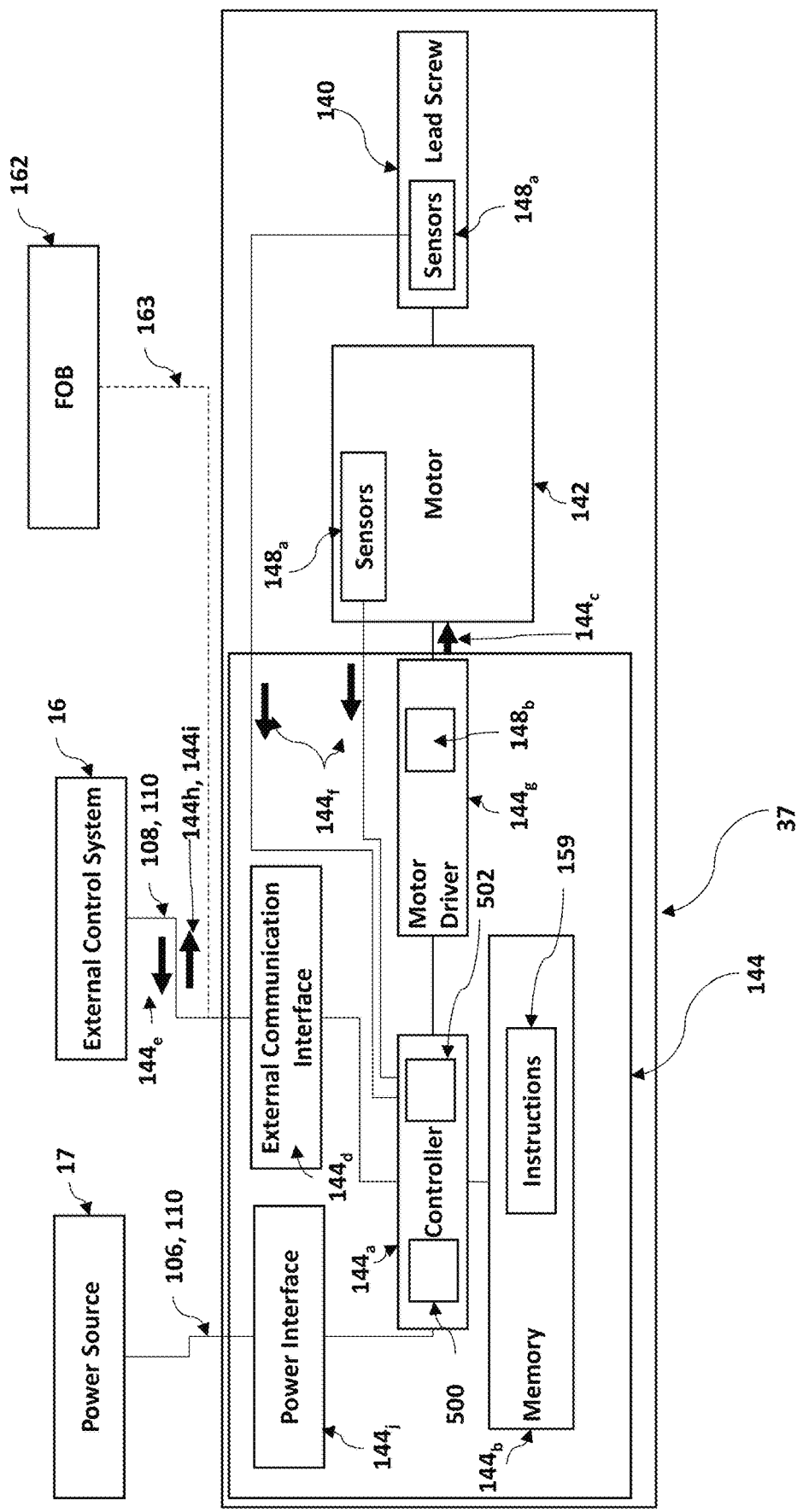
FIG. 12 is a block diagram of the controller circuit for an electronic motor assembly in accordance with an illustrative embodiment.

It is recognized that one embodiment shown in FIGS. 5, 12 and 17A can have the ECU 144 configured as the master controller configured to issue one or more actuations signals $144_c$ to actuate the motor 142 based on the command control signals 108 (or also denoted as command signals $144_e$ with reference to FIG. 12) received via the electrical connection(s) 110 in order to move the closure panel 14 between the open position and the closed position. As such, the electrical connection(s) 110 would be used to supply a generic indication of an open or close command 108, as an example, issued from a vehicle control system 16, such as the BCM, or directly from an open/close switch (e.g. a key fob 162 over wireless link 163, an exterior closure panel handle, an interior closure panel handle, a smart latch 43, a latch controller 116, etc.) for receipt by the ECU 144 acting as the master controller. The command 108, such as an open or close command, would not be directly transmitted by the ECU 144 to the motor 142, rather the ECU 144 would be responsible for processing the open/close command 108 and then generating additional actuation signals $144_c$ for direct consumption by the motor 142 (see FIG. 12). In terms of master controller functionality, the ECU 144 operating as the master controller would be responsible for implementing control logic stored in a physical memory $144_b$ for execution by a data processor, such as processor $144_a$, to generate the actuation signals $144_c$ (e.g. in the form of a pulse width modulated voltage for turning on and turning off motor 142 and controlling its direction and speed of output rotation of the lead screw 140, in accordance with an illustrative example) to power the motor 142 in order to control its operation—see FIG. 12. As illustrated in FIG. 12, the ECU 144 is electrically coupled a motor driver $144_g$ including field-effect transistors (FETSs) $148_b$ which are appropriately controlled (switched on/off) by the ECU 144 to generate the actuation signals $144_c$. Circumstances surrounding the control of the motor 142 could include receiving sensor signals (via electronic components 148 as sensors—e.g. position sensors, direction sensors, obstacle sensors, etc.) by the master controller as the ECU 144, processing those sensor signals, and adjusting operation of the motor 142 accordingly via new and/or modified actuation signals $144_c$ (e.g. adjust the period of PWM based actuation signals $144_c$ in the configuration where the motor 142 is responsive to supplied PWM signals). In this example, the sensor signals $148_f$ of sensors $148_a$ and the actuation signals $144_c$ are generated and processed internally in the housing 35 by the ECU 144, in conjunction with the motor 142 also mounted within the housing 35. As such, signals 108 could represent generic open/close signals, or other commands, coming from the handle(s), or other control system etc., while the actual actuation signals $144_c$ received by and consumed (i.e. processed) by the motor 142 would be generated by the ECU 144.

Figure 18A:
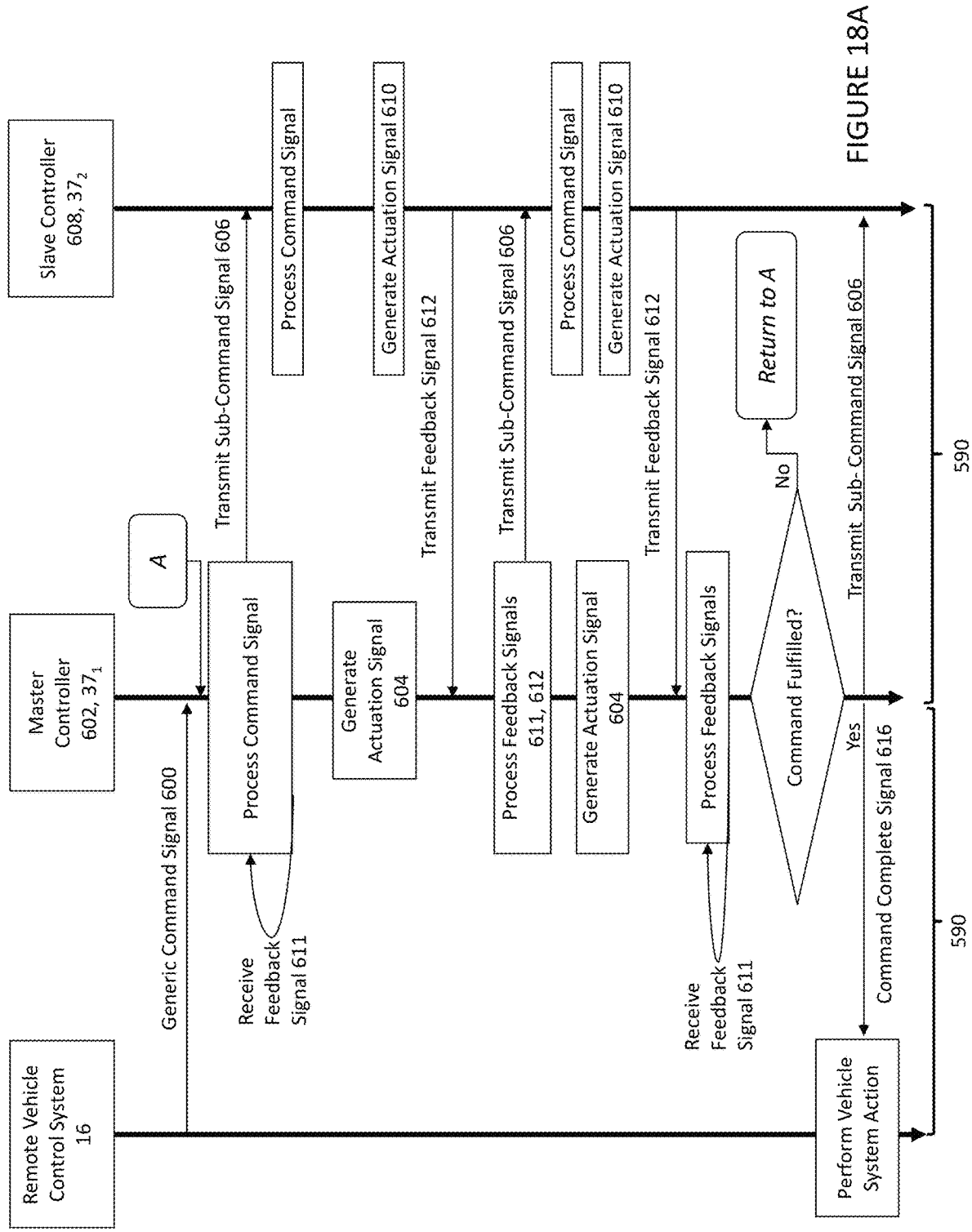
FIG. 18A is a flow diagram of an example communication exchange of the distributed control system of FIG. 17A between a remote vehicle control system, a master controller and a slave controller, in accordance with an illustrative embodiment.
Figure 18B:
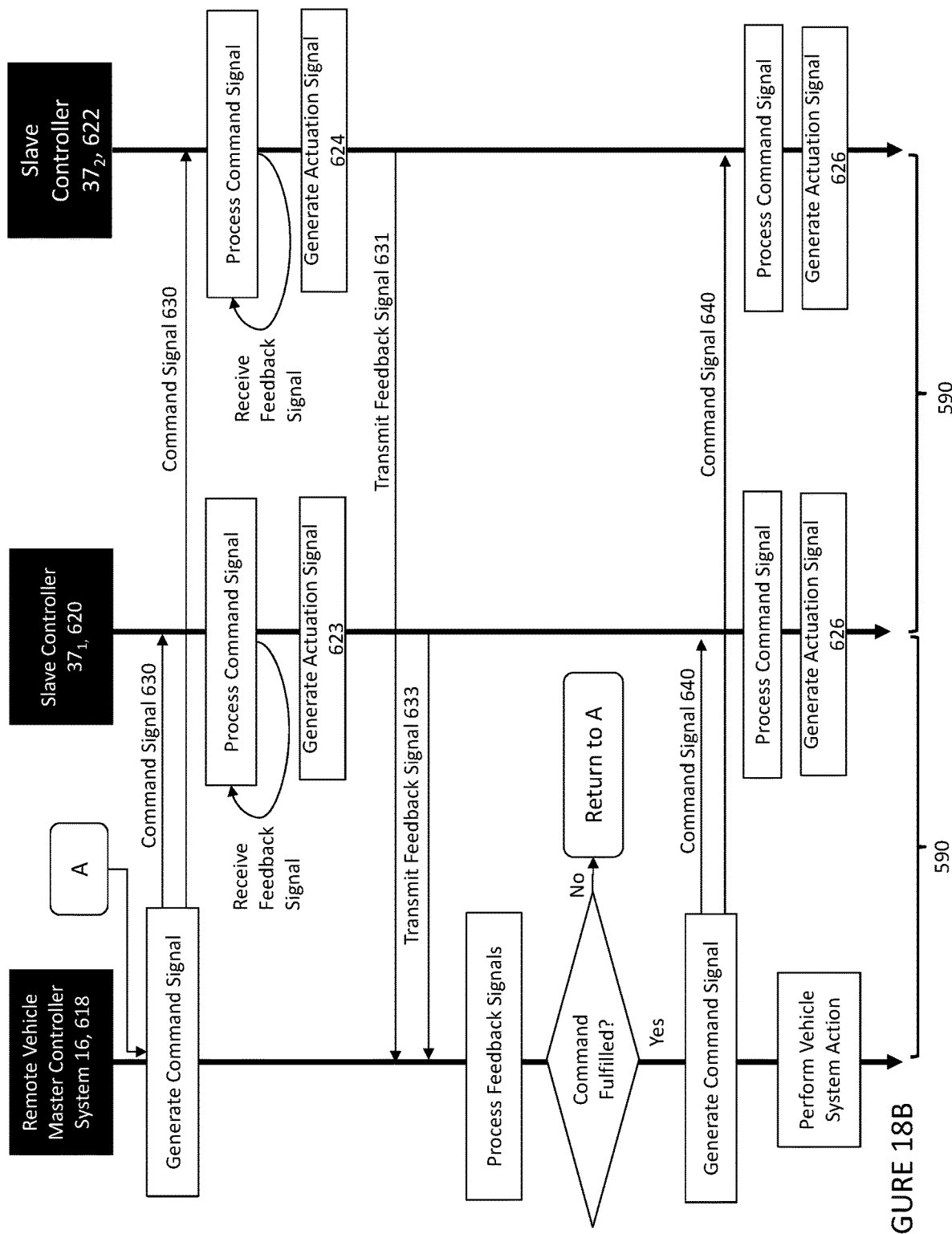
FIG. 18B is a flow diagram of an example communication exchange of the distributed control system of FIG. 17B between a remote vehicle control system and two slave controllers, in accordance with an illustrative embodiment.
Figure 19:
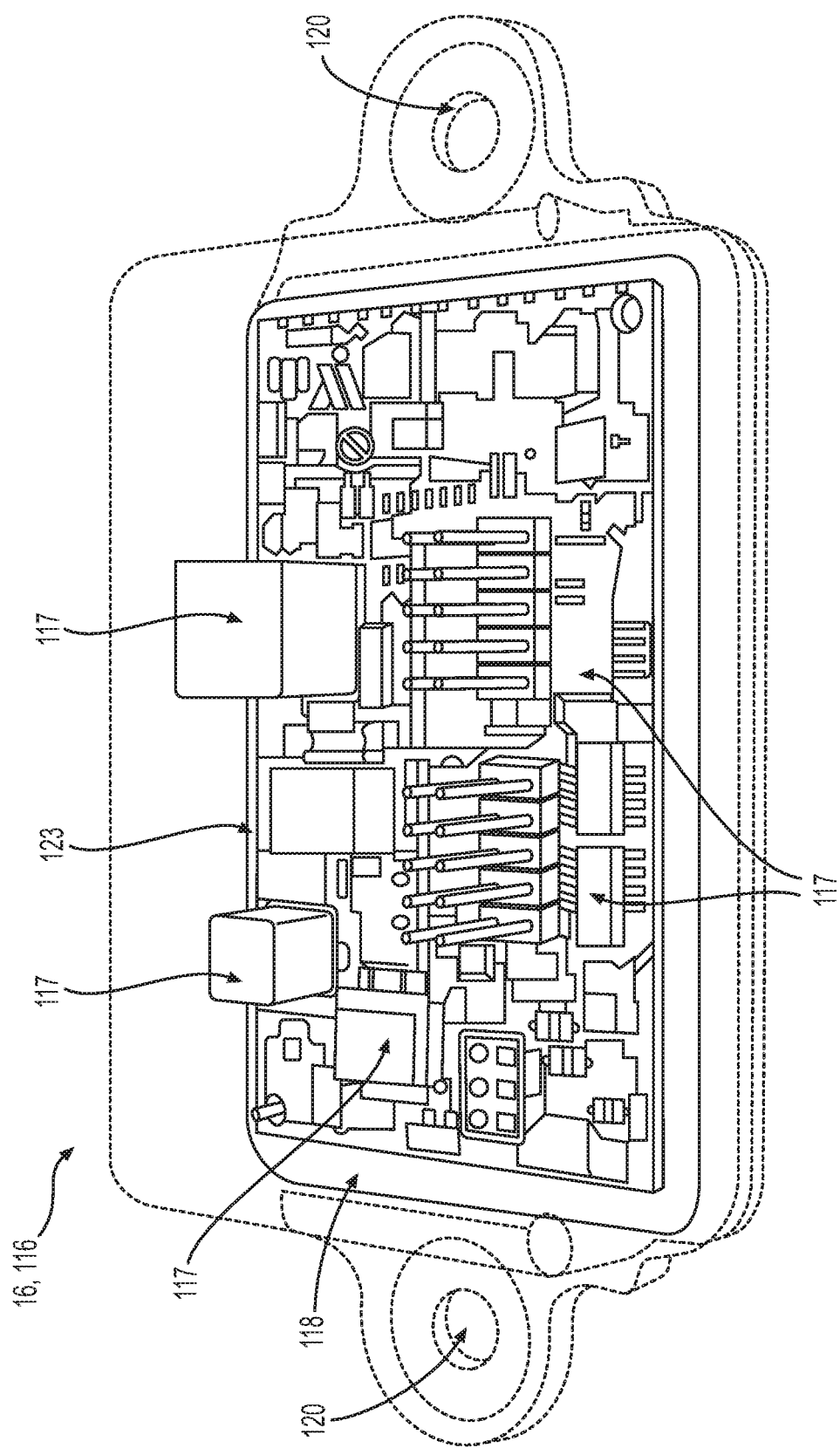
FIG. 19 is a perspective view of a latch control module viewed with a semi transparent housing, in accordance with an illustrative embodiment.

The above presented embodiment of the ECU 144 (mounted internal to the housing 35) as the master controller is distinct from another embodiment shown in FIGS. 17B and 18B, in which the ECU 144 acts as a slave controller to a master controller mounted in the vehicle control system 16, (such as latch control system 116 positioned in a housing 118 external to the housing 35). As such, the master controller functionality supplied by the master control system 16 (e.g. the latch control system 116, see FIG. 19 as an illustrated embodiment) is responsible for acting on a received open/close command (e.g. from a handle or key fob) and then implementing motor 142 operation via instructing the ECU 144 with lower level command details (i.e. motor speed, motor position, PWM frequency, motor mode of operation (i.e. stop motor upon manual user control detection), as but some examples) to generate the actuation signals 144$_c$ appropriate to the circumstances of the closure panel 14 (e.g. cognizant of one or more sensor signals 144$_f$ obtained from the electronic components 148 acting as sensors, as further discussed below). In this further embodiment, the signals 108 processed and transmitted from the ECU 144 (acting as the slave) to the master controller 16), such as feedback signals 144$_h$, could optionally include the sensor signals 144$_f$ generated from the electronic components 148 acting as sensors (see FIG. 12), which may indicate speed, position, torque output, etc. In reference to FIGS. 1 and 2, the master controller positioned in the vehicle control system 16 (remote from the housing 35) can be referred to as the source 8 in an illustrative embodiment.

Figure 7:
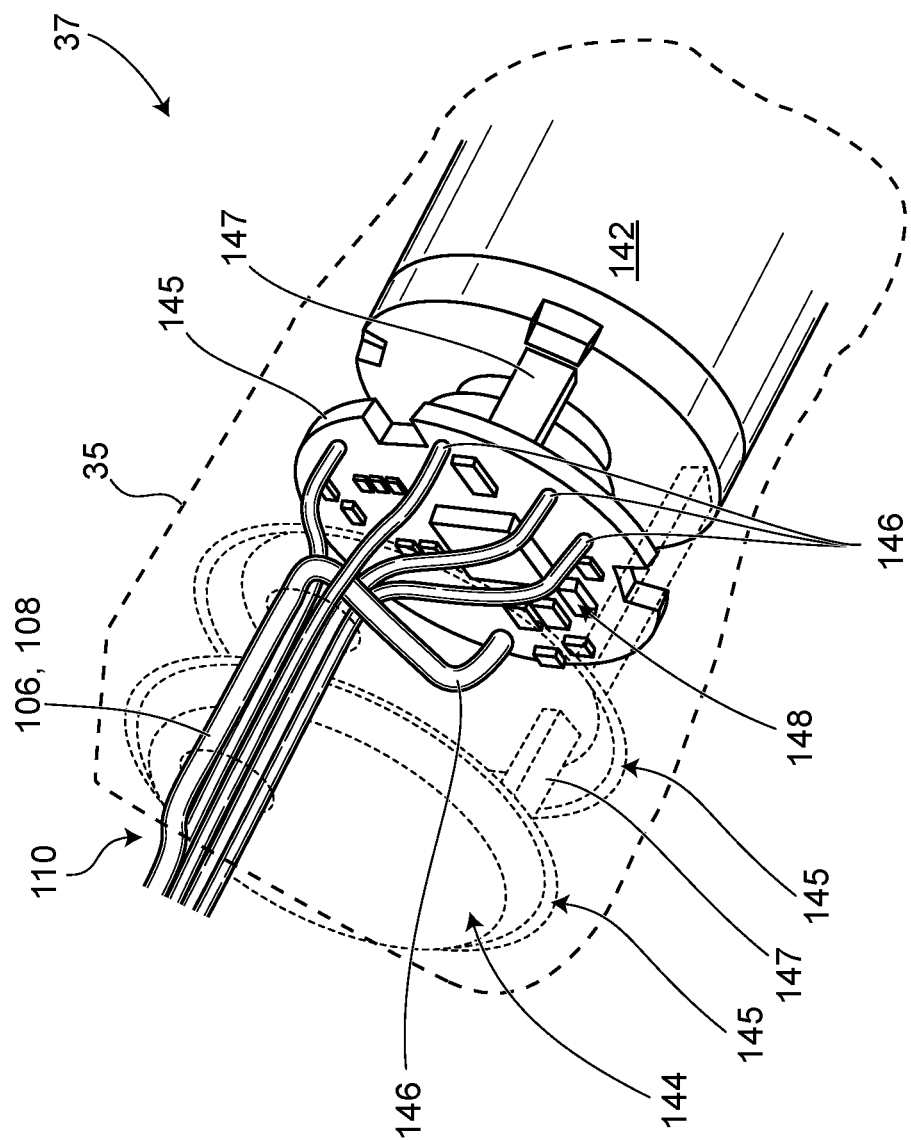
FIGS. 7 and 8 are perspective views of alternative embodiments of the electronic motor assembly of FIG. 6.

Also as shown in FIG. 5, the electrical connection(s) 110 enter through the end wall 126 of the housing 35, in order to be electronically coupled to the ECU 144 at one or more electrical connection locations 146 as also shown in FIG. 7, so as to provide for integrated location of the ECU 144 completely within the interior of the housing 35 to provide for an advantage of limiting spatial (e.g. footprint) requirements (in the vehicle 10) of the electronically controlled electromechanical biasing member 37 laterally, with respect to the longitudinal axis 41. The need to retain/contain the spatial envelope sizing of the electronically controlled electromechanical biasing member 37, while also providing for location of the ECU 144 in close proximity to the motor 142 and within the interior cavity 124 of the housing 35, is considered important. The electrical connection(s) 110 are illustratively enveloped by a protective boot 99 illustratively made from a plastic or rubber like material, which also encase the end wall 126 of the housing 35 so as to provide support to the electrical connection(s) 110 and sealing from the external environment of the inner cavity 124 (defined by the opposed interior walls 153 of the lower housing 112).

Figure 6:
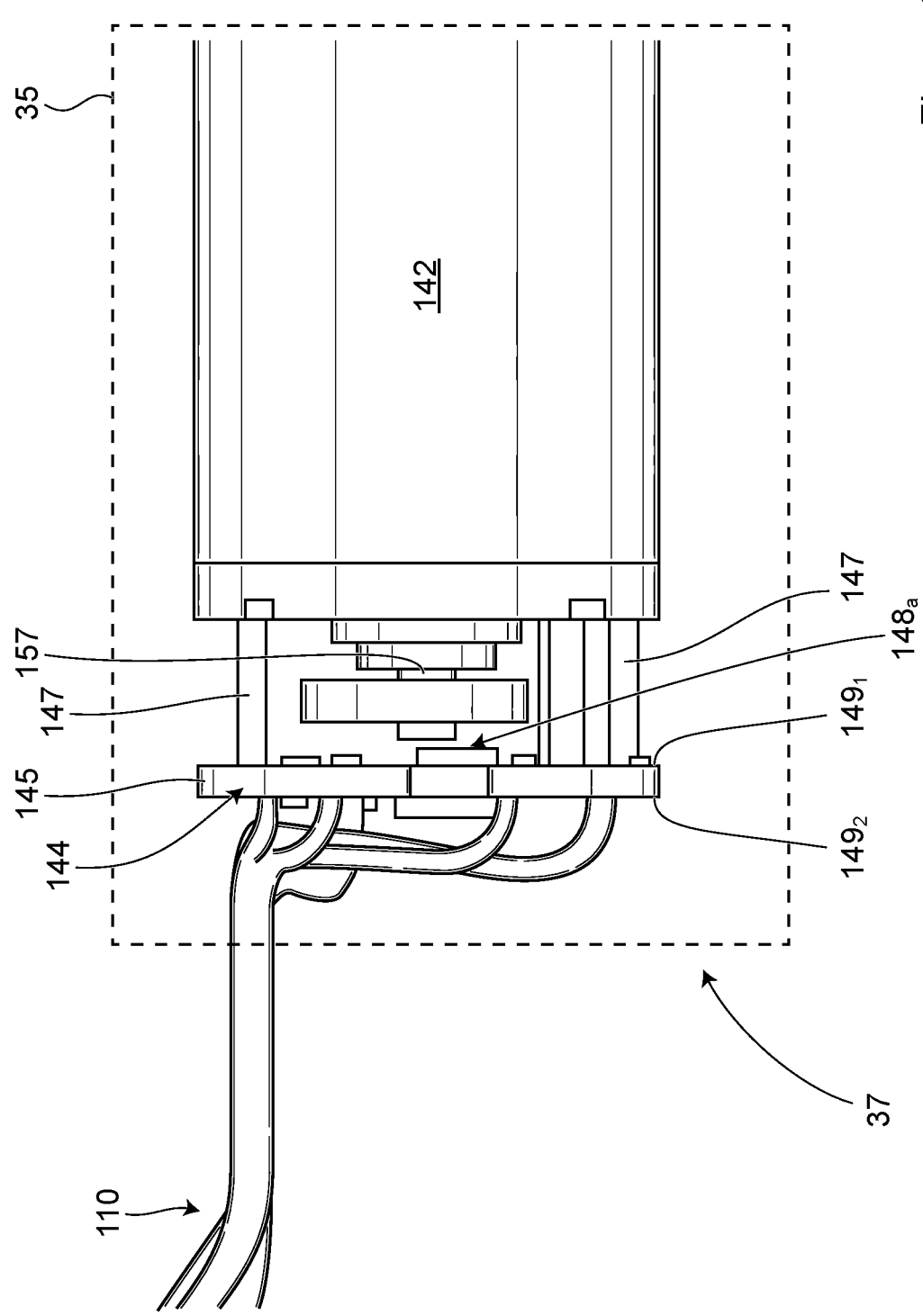
FIG. 6 shows a partial side view of the electronic motor assembly of the electromechanical biasing member of FIG. 5.
Figure 8:
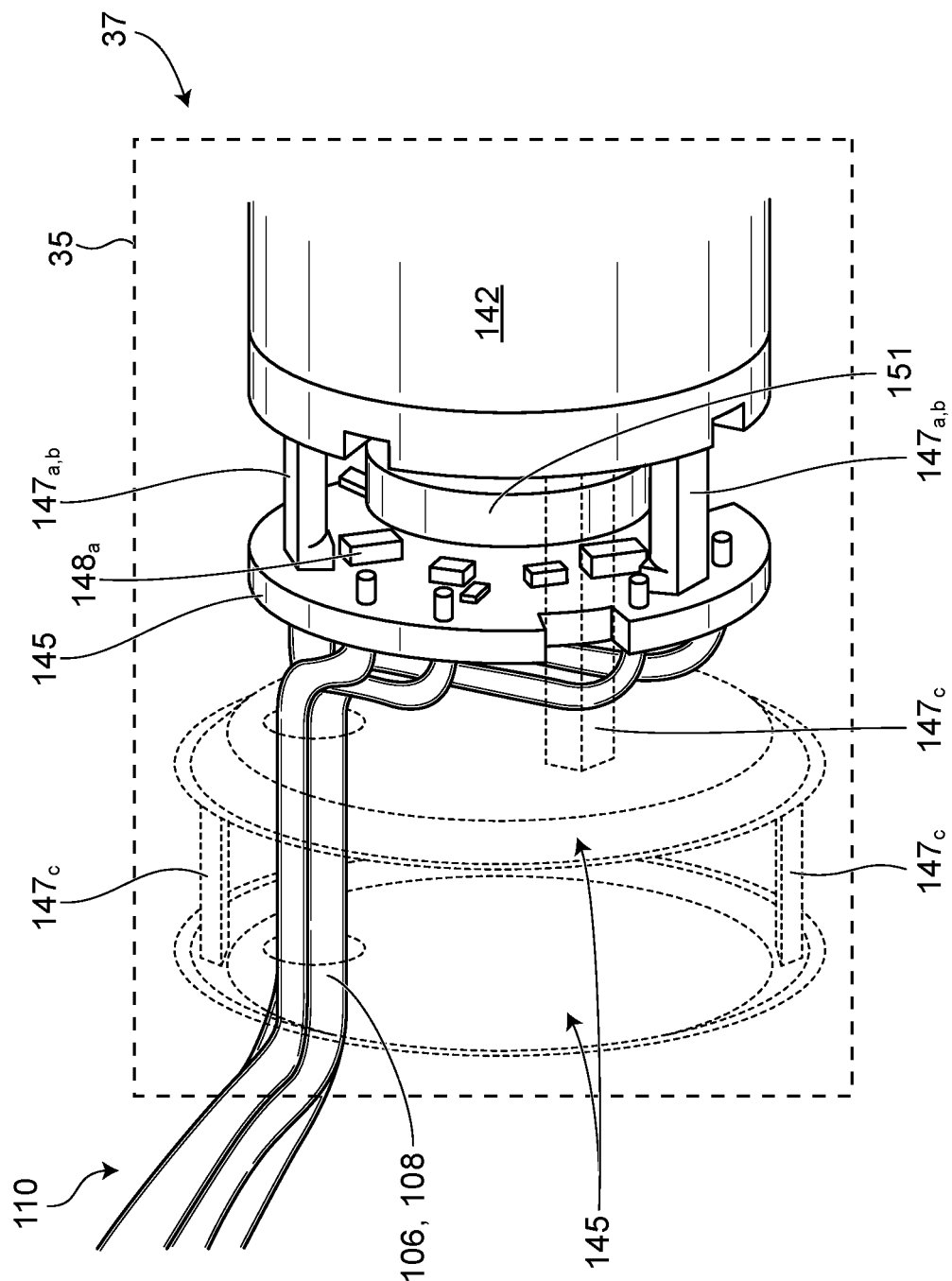

As shown in FIGS. 6,7,8, the ECU 144 can be provided as one or more controller boards, also referred to as Printed Circuit Boards 145 (PCBs), containing a number of electronic components 148 mounted thereto using techniques such as soldering for example. The PCB 145, as generally known in the art, provides a substrate for mechanically supporting the components 148 thereto as well as providing electrical connections for the electronic components 148 with one another using conductive traces, pads and other features etched from one or more sheet layers of copper laminated onto and/or between sheet layers of a non-conductive substrate. Components 148 are generally soldered onto the PCB 145 to both electrically connect and mechanically fasten them to the PCB 145. As shown, the ECU 144 can be implemented as the master controller, as the slave controller, or as a combination thereof. Illustratively as shown in FIG. 6, the PCB 145 is a double sided PCB 145 having components mounted on the plane surface of first a surface 149$_1$ facing the motor 142 and a plane surface of an opposite side 149$_2$ facing away from the motor 142. The PCBs 145 are illustratively circular defining a circular profile P and have a circular outer perimeter edge 167, for receipt within the confines of the housing 35 inner surface 155 which is also illustratively circular and has a diameter slightly larger than the PCB 145 diameter, as shown in FIG. 11. The PCBs 145 may be substantially circular and have a substantially circular outer perimeter, intended to mean that the radius of the PCB 145 about its center C is not equal at all angular points on its perimeter. Other shapes of the PCB 145 are also possible, such as square, elliptical or semi-circular, without limitation. Illustratively, notches 152 may be provided along the perimeter of the PCBs 145, such that the PCB 145 has a substantially circular outer perimeter.

Figure 10:
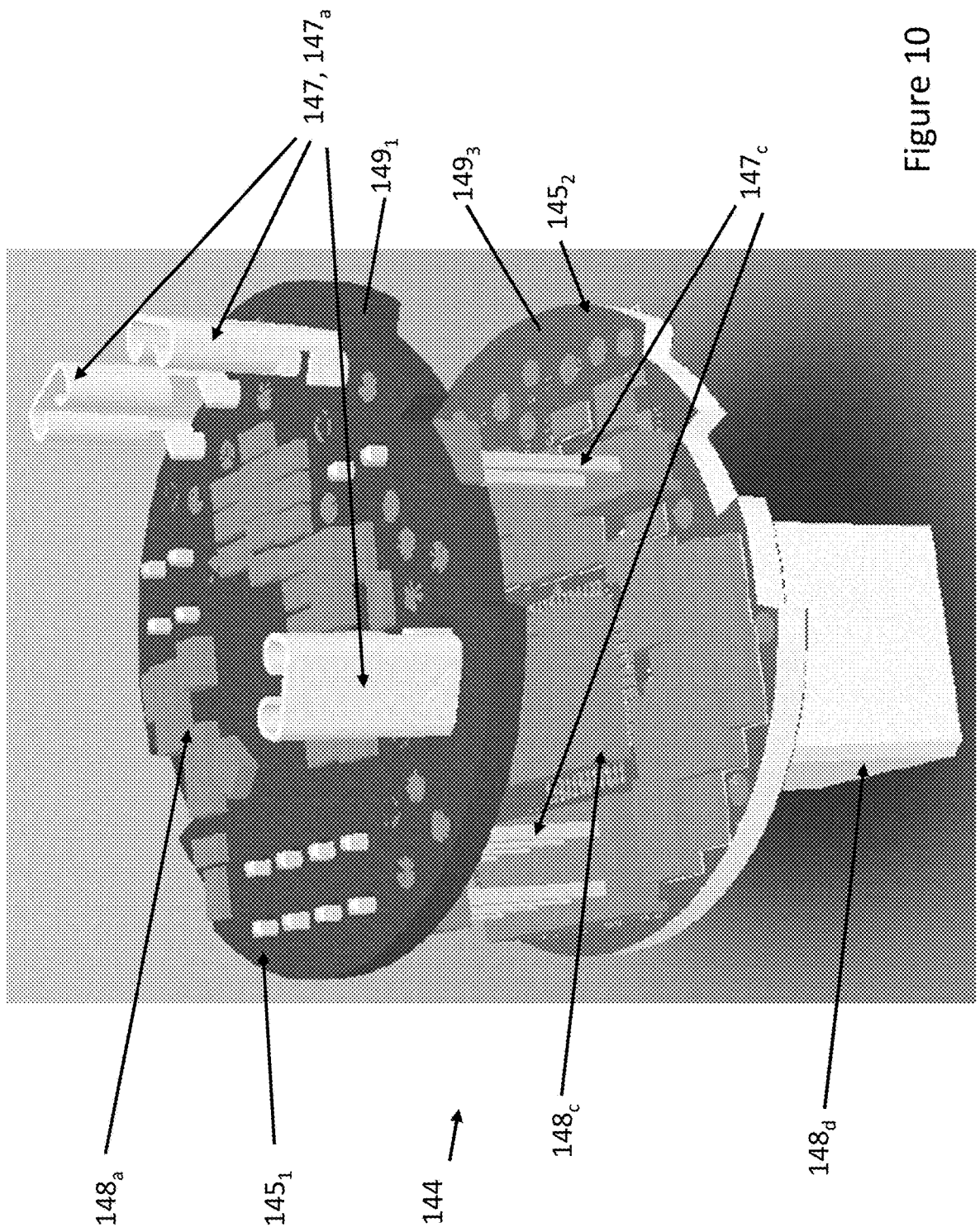
FIG. 10 shows an assembled stacked configuration of controller boards of the electronic motor assembly of FIGS. 7 and 8.

For exemplary purposes, the housing 35 is shown in FIGS. 6, 7, 8 in ghosted view. Also shown in FIGS. 7, 8, and 10 are a plurality PCBs 145 forming the ECU 144, one as a PCB 145$_1$ connected to the motor 142 via electrically conductive legs 147, so as to position the ECU 144, for example the PCBs 145, in a spaced apart orientation along the longitudinal axis 41 (e.g. the plane surfaces of the PCBs 145 are perpendicular to the longitudinal axis 41) from the motor 142. In one embodiment, the legs 147 are equally radially distributed adjacent the perimeter of the PCB 145$_1$, as shown in FIG. 11, but other distribution patterns are contemplated as illustrated in FIG. 10 as an example. In the illustrated embodiment of FIGS. 5 and 10, the legs 147 are illustratively provided as motor blade receptacles 147$_a$ configured to be attachable to the motor 142, for example by slidable receipt of the motor blades 147$_b$ of the motor 142 extending from the motor end wall 143, the motor blade receptacles 147$_a$ projecting from one side (i.e. surface 149$_1$) of the PCB 145$_1$ parallel to the longitudinal axis 41 towards the motor end wall 143. The electrically conductive legs 147 conduct the electrical signals generated by the ECU 144 (i.e. provided by the motor driver FETS 148$_b$) to operate the motor 142, as well as conduct sensed signals 144$_f$, such as current spikes, generated by the motor 142, representative of an electric motor operation (e.g. spikes representative of motor rotation, or stall conditions, and other operating conditions of the motor 142) to the control unit (e.g. ECU 144). The motor blade receptacles 147$_a$ are illustratively provided radially dispersed and projecting from the PCB 145 such that when connected with the motor blades 147$_b$, the PCB 145$_1$ is both mechanically supported and aligned with the motor 142, for example the at least one controller board 145 geometric center C is aligned co-axial with a longitudinal axis 41 of the motor shaft 157. An offset alignment is also possible depending on the configuration of the boards 145. In other words, the support members (e.g. legs 147) support the at least one controller board (e.g. PCB 145) such that the plane surface of the at least one controller board (e.g. PCB 145) is perpendicular to a longitudinal axis 41 of the motor shaft 157. As a result, the electrical connection established by the legs 147 between the PCB 145 and the motor 142 serves to provide the conductive path for the electrical actuation signals 144$_c$ from the ECU 144 positioned on the PCB 145 as will be further described herein below, while also simultaneously properly positioning and aligning the PCB 145 adjacent the motor 142, and illustratively perpendicular to the longitudinal axis 41, to thereby operate as support members. Further consequence of such connection is the proper positioning of sensors 148$_a$, such as the hall sensors, adjacent the motor shaft 157, and in particular adjacent a magnetic pole(s) 151 mounted to the motor shaft 157 for sensing rotation of the motor shaft 157. A plurality of additional legs 147$_c$ (in ghosted view) can be used to position and support the additional parts of the ECUs 144, for example a second PCB 145$_2$, (in ghosted view) from one another along the longitudinal axis 41, as desired, in a stacked ECU or PCB configuration as illustrated in FIGS. 8 and 10. It is recognized that the legs 147 (e.g. support members) can function as stacked ECU connectors providing electrically conductive paths (i.e. for data/command communications and/or power interconnecting one PCB 145$_1$ to another PCB 145$_2$ to facilitate the communications and operations there between), as desired. For example, the legs 147 can be used to mount the ECU 144 to the motor 142, so as to maintain the ECU 144 juxtaposed to the motor 142. It is recognized in FIGS. 6, 7, 8, and 11 that the PCB 145 of the ECU 144 can extend laterally with respect to the longitudinal axis 41 of the motor shaft 157, such that a lateral extent (i.e. dimension) of the PCB(s) 145 is less than a corresponding lateral dimension of the inner cavity 124 (defined by the opposed interior walls 153 of the lower housing 112) measured with respect to the longitudinal axis 41, as illustrated in FIG. 11A by the lateral extents of the PCB 145 generally represented by the dash lined P relative to the extents of adjacent opposed interior walls 153. In another embodiment, the PCBs 145 of the ECU 144 extend laterally with respect to the longitudinal axis 41 of the motor shaft 157, such that a lateral extent (i.e. dimension) of the PCB(s) 145 is less than a corresponding lateral dimension of the motor 142 measured with respect to the longitudinal axis 41, as illustrated in FIG. 11B by the lateral extents of the PCB 145 generally represented by the dash lined P relative to the lateral extents of motor 142 represented by dashed line MP.

Figure 9:
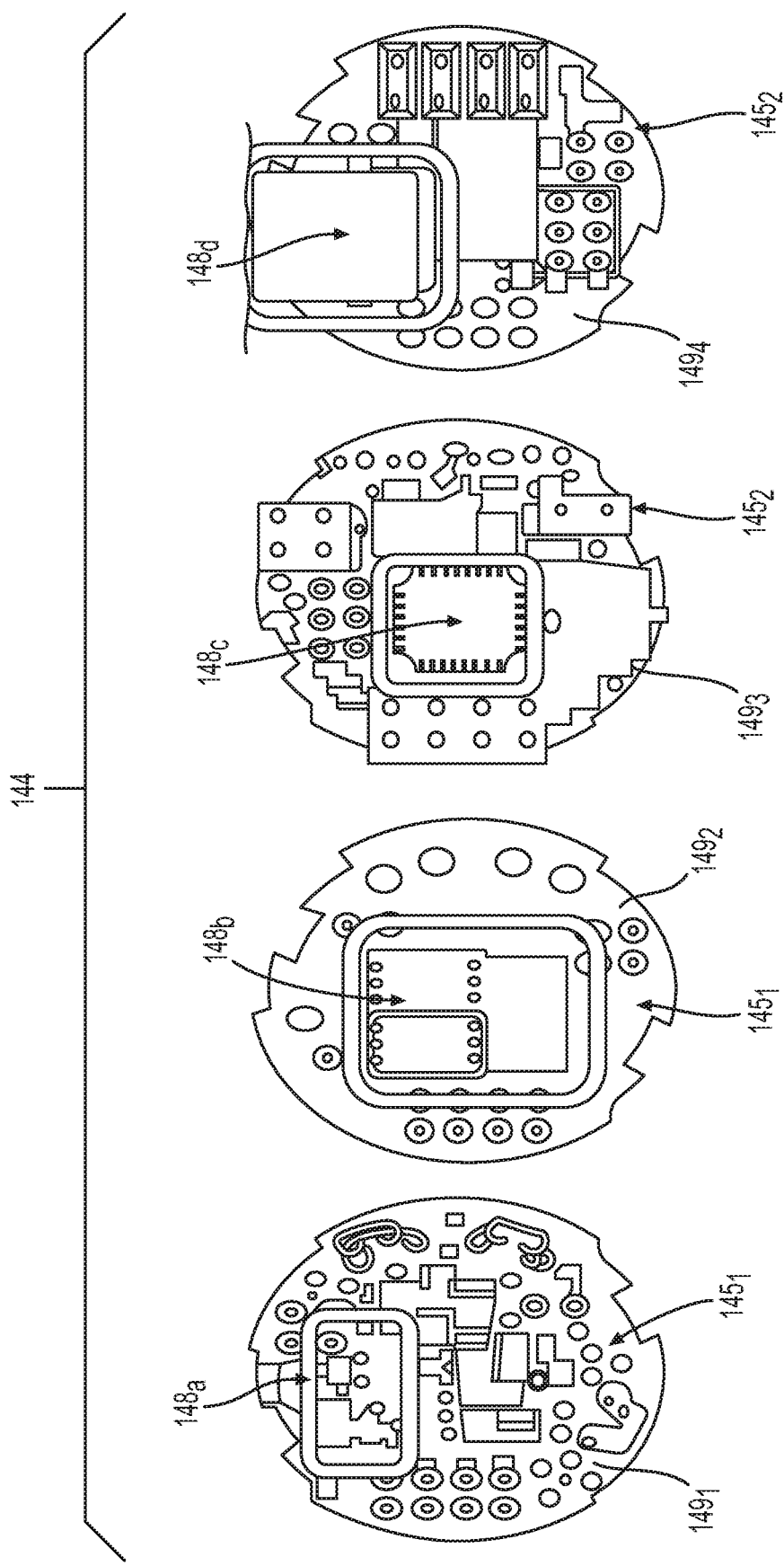
FIG. 9 shows an example unassembled configuration of controller boards of the electronic motor assembly of FIG. 4.

Referring to FIG. 9 and FIG. 12, shown are example electronic components 148 on the ECU(s) 144, for example as mounted to the boards surfaces of the PCBs 145, located within the housing 35, as powered/communicated with via electrical cabling 110. The various electronic components 148 can be mounted through press-fitting or soldering for example onto one board surface 149 or onto both the opposite board surfaces 149 sensors, etc.) for detecting the rotational position/displacement of the lead screw 140, motor shaft 157, and/or motor 142; motor control field-effect transistors (FETSs) $148_b$ for directing operation of the motor 142 rotational speed/position/direction e.g. acting as a load switch to connect or disconnect a source of electrical energy (voltage and/or current) to be supplied by the ECU 144 to the motor 142; a microprocessor or processor $148_c$ illustratively shown as System in Package (SIP) micro-controller logic having number of integrated circuits enclosed in a single module or package such as a microchip mounted to the PCB 145; as well as electrolytic capacitors $148_d$, resistors and other passive and/or active components for power and signaling conditioning requirements of the motor 142, electronic sensors $148_a$, and processor $148_c$ and other components 148 are provided. It is advantageous to have the sensors $148_a$ mounted on the PCB(s) 145 of the ECU 144, illustratively on surface $149_1$, located within the housing 35 and therefore adjacent to the motor 142, as sensor performance (noise characteristics for example due to electromagnetic interference EMI) are improved when sensor signals $144_f$ are directly processed by the other electronic components 148 on the ECU 144, rather than having to be communicated through the wall of the housing 35, via electrical connection(s) 110, to an externally located electronic controller (e.g. of the control system 16) prior to signal processing (all or a portion thereof).

Referring to FIG. 10, shown is an example of stacked PCBs 145 forming the ECU 144 adjacent to the motor 142. Illustratively, the sensors $148_a$ are mounted to a first PCB $145_1$ on surface $149_1$ on the same side as the motor blade receptacles $147_a$, whereas the FETS $148_b$ are mounted on the opposite board surface $149_2$ of the same PCB $145_1$. The first PCB $145_1$ is coupled to a second PCB $145_2$ illustratively via the connector pins $147_c$, with the second PCB $145_2$ having the processor $148_c$ mounted on a first side $149_3$ of the second PCB $145_2$ facing the second side $149_2$ of the first PCB $145_1$, and the electrolytic capacitors $148_d$ mounted on the opposite board surface $149_4$ of second PCB $145_2$. While the sensors $148_a$ are shown as being mounted to the first PCB $145_1$, it is recognized that the sensors $148_a$ can be implemented as some of the electrical components 148 on the PCBs 145 or otherwise mounted off of the PCBs 145, such as positioned in the motor 142, or adjacent the lead screw 140, or elsewhere, while being electrically connected to the PCBs 145.

Referring now to FIG. 12, the integrated ECU 144 of the electromechanical biasing member 37 and its interconnection with the various electronic components 148 is schematically represented. The ECU 144 can include a processor $144_a$ (e.g. microprocessor or processor $148_c$) and a set of instructions 159 stored in the physical memory $144_b$ for execution by the processor $144_a$ to determine the actuation signals $144_c$ (for example, actuation signals in the form of a pulse width modulated voltage for turning on and turning off motor 142 and controlling its direction of output rotation) to power the motor 142 to control its operation in a desired manner. The memory $144_b$ may include a random access memory ("RAM"), read-only memory ("ROM"), flash memory, or the like for storing the set of instructions 159, and may be provided internal the processor $144_a$ or externally provided as a memory chip mounted to the PCB 145, or both. The memory $144_b$ may also store an operating system for general management of the ECU 144. As such, the electrical components 148 with the PCB(s) 145 can be considered an embodiment of the control circuitry provided by the ECU 144 which operate together to form at least one computing device for processing data by a processor (e.g. processor $144_a$) such as communication signals, command signals $144_e$, sensor signals $144_f$, feedback signals $144_h$ and executing code or instructions stored in a memory (e.g. memory $144_b$) and outputting motor 142 control signals and for processing other communication/control signals and algorithms and methods in a manner as illustratively described herein.

Figure 13:
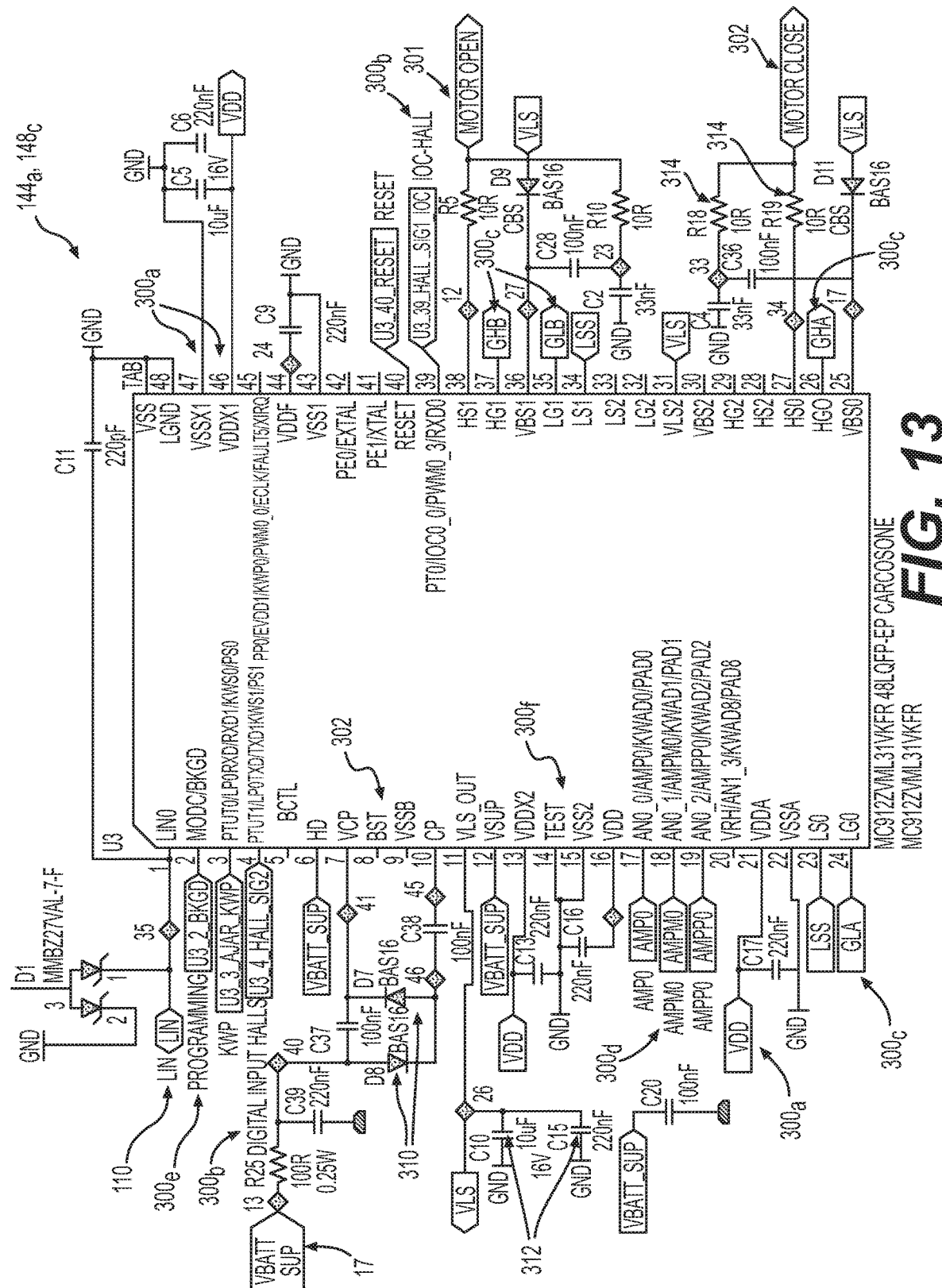
FIG. 13 is a circuit diagram of a processor for a control unit of the electromechanical biasing member of FIG. 5, in accordance with an illustrative embodiment.

Now referring to FIG. 13, there is illustrated a circuit diagram of a processor $144_a$ (e.g. microprocessor $148_c$) in accordance with an illustrative embodiment. The processor $144_a$ (e.g. microprocessor $148_c$) is mounted to PCB 145 and includes a number of input/output ports 300 providing various interfaces with internal and external signals lines, such as power ports $300_a$ which may be illustratively connected to main vehicle power source 17 via the communications lines 110, digital and analog hall sensor port $300_b$, FET control ports $300_c$ for providing FET control signals for controlling the switching of the FETs $148_g$ to generate the actuations signals $144_c$ to be supplied to the motor 142 via the motor blade receptacles $147_a$, such as motor open signal port 301, and motor close signal port 302, operational amplifier ports $300_d$ for interfacing with current sensing circuits (not shown), programming ports $300_e$ for receiving programming instructions, for example from memory $144_b$ and testing ports $300_f$, as examples. Supporting electronics such as diodes 310, capacitors 312, and resistors 314 are provided for conditioning signals and signal levels to be provided to and/or supplied by to the processor $144_a$ (e.g. microprocessor $148_c$).

Further, referring back to FIG. 12, the ECU 144 can have a communication interface $144_d$ to receive any power and/or data/command signal(s)), such as receive control command signals $144_e$ from the electrical connection(s) 110 (issued by the remote/external control system 16) and in turn to control the operation of the motor 142 in response. The ECU 144 may optionally have a dedicated power interface $144_1$. Likewise, communication interface $144_d$ may be configured to supply power and/or data/command signal(s)), such as subcommand signals $144_1$ to the electrical connection(s) 110 (for transmission to external systems from the electromechanical biasing member 37, or other electromechanical biasing members 37 when operating as a slave device). The communication interface $144_d$ may include one or more network connections adapted for communicating with other data processing systems (e.g., similar to ECU 144 provided on another biasing member 37 in communication) over a vehicle network or bus via, and in the illustrative embodiment over the electrical connection(s) 110 which may form part of such as bus. For example, the communication interface $144_d$ may be connected to a Local Interconnect Network (LIN) or CAN bus or the like network protocol, over which command signals issued by the control system 16 over the vehicle network may be received and/or transmitted. As such, the communication interface $144_d$ may include suitable transmitters and receivers. Thus, the ECU 144 may be linked to other data processing systems by a communication network, which electrical connection(s) 110 may form part of. The communication interface $144_d$ may also be of a wireless configuration capable of sensing and transmitting communication signals wirelessly, for example using RF frequencies or the like, over wireless link 163. The input/output arrangements of the communication interface $144_d$ can be built into an I/O arrangement on the PCB(s) 145 of the ECU 144 for integration within the housing 35. Optionally, it may be integrated into the microprocessor $144_a$.

Command signals $144_e$ received by the communication interface $144_d$ may include data related a generic or high level command to open the closure panel 14 to a certain position; to hold the closure panel 14 at this position; to fully open the closure panel 14; to fully close the closure panel 14; as but a list of non-limiting examples of commands. For example, a generic "CLOSE" command received by the communication interface $144_d$ could result in the actuation signal $144_c$ to drive the motor 142 at certain speeds (e.g. the ECU 144 may control the switching frequency of FETS $148_g$ to adjust the power allowed to be conducted to the motor 142) over a defined path of movement from fully open, to a point/position before the fully close position where the actuation signal $144_c$ would be adjusted by the ECU 144 to reduce the speed of operation of the motor 142 (e.g. the ECU 144 may decrease the switching frequency of FETS $148_g$ to adjust the power allowed to be conducted to the motor 142) and stop movement of the closure panel 14 (e.g. the ECU 144 may control the FETS $148_g$ to stop conducting power to the motor 142) at a predefined point/position of the closure panel 14. For example, such a point may correspond to a position of the closure panel 14 whereat the latch 43 engages a striker 44 provided on the vehicle body 11 where it is in an aligned position of with the striker 44 to perform a cinching operation to thereby transition the closure panel 14 to the fully closed position without an operation of the motor 142, the cinching operation involving the transitioning of the latch 43 from a secondary latched position to a primary latched position as is generally known in the art. As a result, the striker 44 provided on the closure panel 14 which is moved by the movement of the closure panel 14 into a position where the striker 44 engages the secondary position of the latch 43 to capture and maintain the striker 44 in latched engagement with the latch 43. At such a position, the motor 142 may be deactivated so as not to interfere with the cinching operation of the latch 43. Sensors 197 provided in the latch 43 and in communication directly or indirectly with the ECU 144, (for example via electrical connection(s) 110) may assist the ECU 144 to determine locally the actuation signal $144_c$ required to stop the motor 142 at this position. Illustratively, sensor 197, such as an accelerometer, (see FIG. 2) may generate sensor signals to be communicated from the latch 43 to the ECU 144 via the electrical connections 110. It is recognized that other command signals can be issued, such as to move the closure panel 14 from the fully opened to a secondary latching position whereat the vehicle latch 43 is moved into the secondary latched position in position for a cinching operation to transition the latch 43 from the secondary position to the primary latched position, and for other closure panel 14 movement operations. The processor $144_a$ can therefore be programmed to execute instructions as a function of the command signals $144_e$ transmitted and received by the communication interface $144_d$ as Local Interconnect Network protocol signals such as but not limited to commands for operating electronic motor assembly 15 in a mode of operation including: a position request for motion mode, a push to close command mode, a push to open command mode, a time detected obstacle mode, a zone detected obstacle mode, a full open position detected mode, a learn mode, and/or an adjustable stop position mode, as will be described herein below in more detail.

Figure 14:
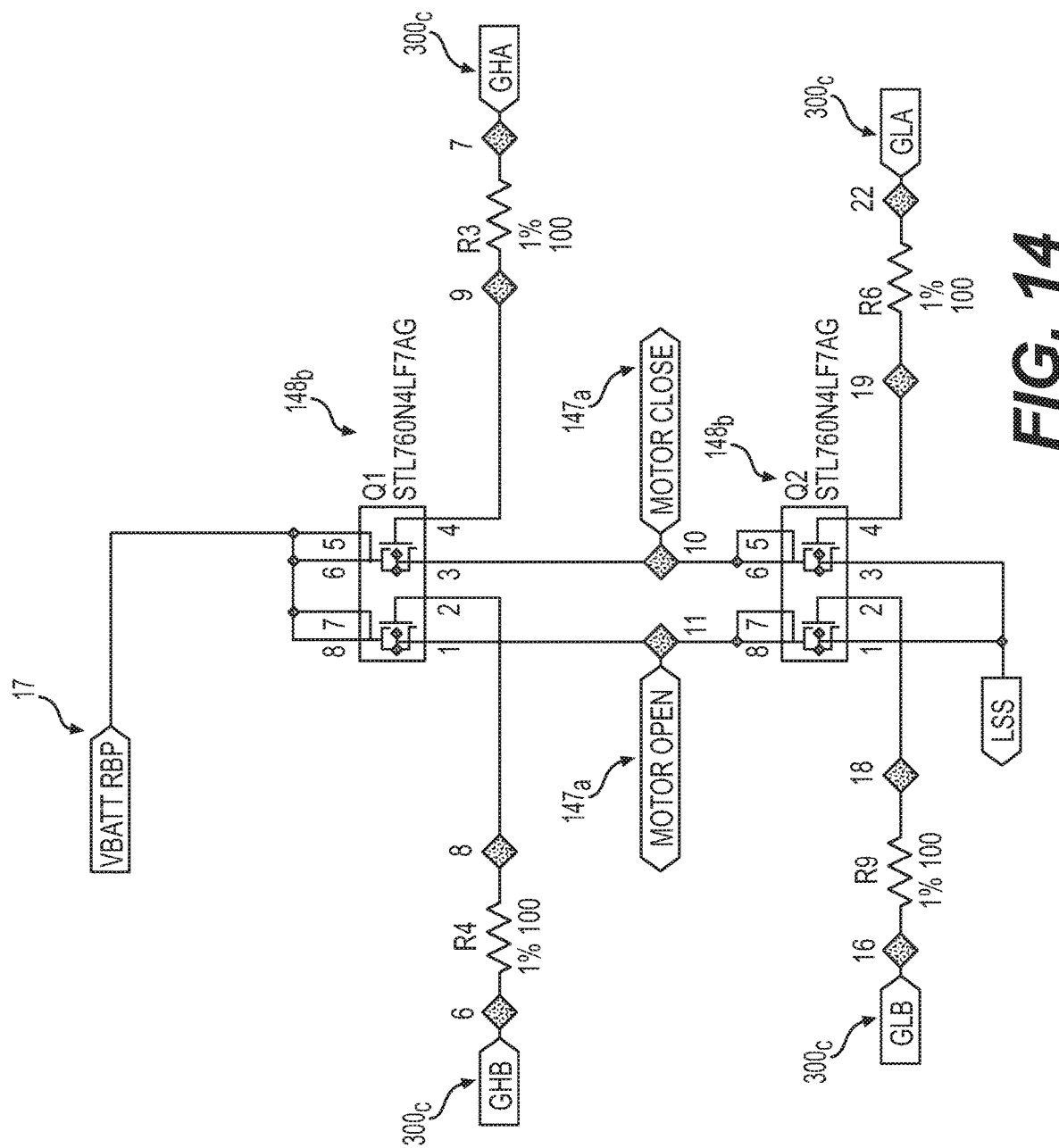
FIG. 14 is a circuit diagram of a FET switching circuit of the electromechanical biasing member of FIG. 5, in accordance with an illustrative embodiment.

Now referring to FIG. 14 in addition to FIGS. 12 and 13, the ECU 144 is configured to interpret the command signals $144_e$ received at the communication interface $144_d$ from the external or remote system 16 and in response activate the motor driver $144_g$ including the FETS $148_b$ appropriately, for example based on a stored movement sequence or profile stored in memory $144_b$ and referenced (e.g. looked up in memory $144_b$) based upon, at least in part, the received command signals $144_e$. Such predefined stored movement sequences of the closure panel 14 may be recorded in the memory $144_b$. For example, the received command signals $144_e$ may be a digital message encoded according to a communication protocol (e.g. a serial binary message-based protocol), the ECU 144 capable of decoding the digital message to extract the command (e.g. converts the data stream received by the communication interface $144_d$ as serial bits (voltage) levels into data that the ECU 144 can process). In response, ECU 144 may issue FET control signals to FET control ports $300_c$ to control the operation of the FETs $148_b$ (e.g. control the FET gates) to supply current and/or voltage to the motor blades receptacles $147_a$ to operate the motor 142.

The ECU 144 can be further programmed by the execution of instructions 159 to operate the motor 142 based on different desired operating characteristics of the closure panel 14. For example, the ECU 144 can be programmed to open or close the closure panel 14 automatically (i.e. in the presence of a wireless transponder (such as a wireless key FOB 162) being in range of the communication interface $144_d$) when a user outside of the vehicle 10 initiates an open or close command of the closure panel 14. Also, the ECU 144 can be programmed to process feedback signals $144_f$ from the electronic sensors $148_a$ supplied to the ECU 144 to help identify whether the closure panel 14 is in an opened or closed position, or any positions in between. Further, the closure panel 14 can be automatically controlled to close after a predefined time (e.g. 5 minutes) or remain open for a predefined time (e.g. 30 minutes) based on the instructions 159 stored in the physical memory $144_b$. For example, the high level generic command (e.g. $144_e$) may include a command labelled, for illustrative purposes only: "Open Profile A", which may be decoded by the ECU 144 to undertake operation of the biasing member 37 to move the closure panel 14 in accordance with a sequence of operations as stored in memory $144_b$ including three aspects such as moving the closure panel 14 to fully open position, a hold open for a period of time (i.e. 3 minutes) after the closure panel 14 has reached the fully opened position, and a fully closing operation after a second period of time (i.e. 5 minutes) after the closure panel 14 has reached the fully opened position. For example, the high level generic command (e.g. 144$_e$) may include a command labelled "Open Profile B", which may be decoded by the ECU 144 to undertake similar operations of "Open Profile A" except replacing the fully closing operation with an expected manual user movement of the closure panel 14 as would be detected by the sensors 148$_a$. Further, the processor 144$_a$ can be programmed to execute the instructions complementing and enhancing the functionality of the closure panel 14 locally of received profile command, for example executing a sub-profile operating mode, based on received signals 144$_f$ from the electric motor 142 representative of an electric motor 142 operation selected from operations such as but not limited to: an electric motor speed ramp up and ramp down operating profile, an obstacle detecting mode for detecting obstructions of the pivotal closure member between an open position and a closed position, a falling pivotal closure member detection mode, a current detection obstacle mode, a full open position mode, a learn completed mode, a motor motion mode, and/or an unpowered rapid motor motion mode.

As another illustrative example of locally controlled operation of the biasing member 37, a manual override function is described. One or more Hall-effect sensors 148$_a$ may be provided and positioned within the housing 35, as illustrated in FIG. 6 the Hall-effect sensors 148$_a$ are positioned on the PCB 145 adjacent to the motor shaft 157, to send a signal, such as an analog voltage time varying signal depending of the change in magnetic field detected by the Hall-effect sensors 148$_a$, representative of operation (e.g. motor output shaft 157 rotation(s)) of the electric motor 142 to ECU 144 that are indicative of rotational movement of motor 142 and indicative of the rotational speed of motor 142, e.g., based on counting signals from the Hall-effect sensor 148$_a$ detecting a target (i.e. magnet 151) on the motor output shaft 157. In situations where the sensed motor 142 speed is greater than a prestored expected threshold speed, stored in memory 144$_b$ for example, and where a current sensor (in the case where ripple counting is employed to determine the operation of the motor 142, such as to determine the position of the motor 142) registers a significant change in a current draw, the ECU 144 may determine that a user is manually moving the closure panel 14 while motor 142 is also operating to rotate the lead screw 140, thus moving the closure panel 14 between its opened and closed positions. The ECU 144 may then send in response to such a determination the appropriate actuation signals 144$_c$ (by cutting the power flow to the motor 142 for example) resulting in the motor 142 to stop to allow a manual override/control of the closure panel 14 by a user. Conversely, and as an example of an object or obstacle detection functionality, when the ECU 144 is in a power open or power close mode and the Hall-effect sensors 148$_a$ indicate that a speed of the motor 142 is less than a threshold speed (e.g., zero) and a current spike is detected (in the case where ripple counting is employed to determine the operation of the motor 142), the ECU 144 may determine that an obstacle or object is in the way of the closure panel 14, in which case the ECU 144 may take any suitable action, such as sending an actuation signal 144$_c$ to turn off the motor 142, or sending an actuation signal 144$_c$ to reverse the motor 142. As such, the controller ECU 144 receives feedback from the Hall-effect sensors 148$_a$, or from a current sensor (not shown) and renders control decisions locally to biasing member 37 to ensure that a contact or impact with the obstacle and the closure panel 14 has not occurred during movement of the closure panel 14 from the closed position to the opened position, or vice versa. An anti-pinch functionality may also be performed in a similar manner to the obstacle detection functionality, to particularly detect an obstacle such as a limb or finger is present between the closure panel 14 and the vehicle body 11 about the nearly fully closed position during the closure panel 14 transition towards the fully closed position.

While the ECU 144 has been described as executing decisions and algorithms to operate the motor 142 for obstacle detection, automatic close and open, anti-pinch functionality, the controller ECU 144 may also be programmed to perform other functions. For example, such functionality executed by the ECU 144 may include dynamic closure panel speed and torque control adjustments (i.e. the ECU 144 can detect an unlevel vehicle surface 9 and operate the motor 142 to adjust the torque output of the motor 142 required to move the closure panel 14), stop-and-hold position request (e.g. the ECU 144 can detect a user manually stopping the closure panel 14 and maintain the closure panel at this position), requests for motion (e.g. the ECU 144 can detect a user manually pushing the closure panel 14 and operate the motor 142 to move the closure panel 14 to the fully closed position, and the ECU 144 can detect a user manually pulling the closure panel 14 to move the closure panel 14 to the fully opened position), falling gate detection (e.g. the ECU 144 can detect a movement of the closure panel 14, due to for example a failed counter-balancing spring or biasing device and apply a brake mechanism (not shown) provided in the biasing member 37 to hinder the movement of the closure panel 14 towards the fully closed position), time based detected obstacle (e.g. the ECU 144 can track the length of time by implementing a counter function to determine the period of time over which the ECU 144 has determined that the speed of the motor 142 is less than a threshold speed (e.g., zero) and a current spike is detected (in the case where ripple counting is employed to determine the operation of the motor 142) indicative of an obstacle, zone detected obstacle (e.g. the ECU 144 can detect the presence of an obstacle in the path of movement of the closure panel 14 in the configuration where the ECU 144 is in communication with an proximity sensor, such as a radar sensor, is provided either externally to the biasing member 37 such as in latch 43, or internally in the biasing member 37. In the configuration where the radar sensor is provided internally the biasing member 37, the radar sensor may be provided on the PCB 145 and aligned with an aperture or port in the housing 35, if the housing 35 is manufacture from metallic material, to allow for radar signals to be transmitted and received therefrom. The ECU 144 in such a configuration may be configured to process the radar signal (i.e. FMCW or Doppler signals) and determine if obstacles are present), current detect obstacle (e.g. ECU 144 can determine a current spike is detected over the signal lines from the motor 142 to the ECU 144 in the case where ripple counting is employed to determine the operation of the motor 142. It is recognized that ripple counting techniques may do away with the Hall sensors 148$_a$ and magnet 151 and be replaced with processing by the ECU 144 involving calculating the ripple frequency using sensed the motor current measurements that has been bandpass filtered to process the relevant spectrum of the motor current), full open position request (e.g. the ECU 144 may automatically move the closure panel 14 to a fully opened positioned), learn completed request (e.g. the ECU 144 can detect the operating characteristics of the closure panel 14, such as the torque profile, and create an opening profile stored in the memory $144_b$ after operating the closure panel 14 in a training mode and sensing the movement represented by the feedback received by the sensors $148_a$, after which the ECU 144 can optimize the torque output and speed for example of the motor 142 for moving the closure panel 14 after having learned the movement characteristics of the closure panel 14 during the training mode operation of the biasing member 37, for example immediately after the biasing member 37 having been installed on the motor vehicle 10, or after an aftermarket accessory has been added to the closure panel 14 resulting in an increase its weight and changing its moving characteristics), motor motion (e.g. the ECU 144 can operate the motor 142 at different torques and speeds depending on the position of the closure panel 14), adjustable stop position (e.g. the ECU 144 can operate the motor 142 to hold the closure panel 14 at a certain position based upon a received command signal $144_e$ which may include position and angle data), short to ground (e.g. the ECU 144 can diagnose operational faults in the control circuitry or electric motor 142 and communicate to the external control system the fault, maintenance and troubleshooting codes and the like), short to battery (e.g. the ECU 144 can diagnose power supply line faults i.e. faults in Electrical power signal line 106 or motor blade connections), open circuit for all components like (e.g. the ECU 144 can diagnose operational faults in the control components such as the motor 142, the Hall effects sensors $148_a$, transient suppression faults, etc.). Other functions may include an unpowered rapid motor motion function which may also be performed by the ECU 144 (e.g. the ECU 144 may electrically disengage an electromechanical clutch of the biasing member 37). Other operating functions as determined and executed by the ECU 144 are also contemplated and are not limited to those described herein.

In view of the above-described configuration, it is recognized that the ECU 144 can have its own software (e.g. set of operating instructions 159) stored in a physical memory $144_b$ for example to configure operation of the motor 142 and optional receipt of the external signals (e.g. command signals $144_e$) via the electric cabling 110 to the controller ECU 144 (e.g. from the handles, latch 43, and/or other vehicle control system 16) and transmission of the signals (e.g. feedback signals $144_h$) externally based on the detection by the internal electronic sensors (for example Hall-Effect sensors $148_a$, ripple counting sensing) via the communication interface $144_d$.

Figure 15:
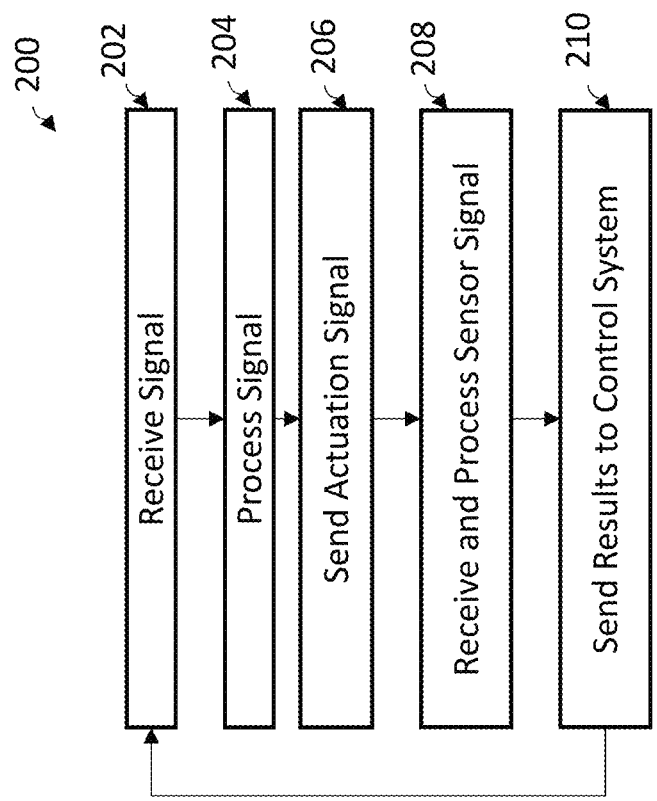
FIG. 15 is flowchart of an example operation of the electromechanical biasing member of FIG. 4 operating as a slave controller.

Now referring to FIG. 15, in addition to FIG. 12, there is provided is a flow chart illustrating a method of operation 200 of the electronic motor assembly 15 as controlled by ECU 144 according to instructions representing steps of the method 200 as stored in memory $144_b$ and executed by the processor $144_a$, in accordance with an example embodiment. A person of ordinary skill in the art will understand that the ECU 144 of the electronic motor assembly 15 may be programmed to enable the practice of the method 200. Moreover, program instructions for use with the ECU 144, stored on memory $144_b$ or other similar computer readable medium or computer program product including the instructions recorded thereon, may direct the ECU 144 to facilitate the practice of the method 200. In particular, the sequences of instructions which when executed cause the method described herein to be performed by the ECU 144 may be contained in the memory $144_b$ in electrical communication with the ECU 144. This data carrier product may be loaded into and run by the ECU 144. In addition, the sequences of instructions which when executed cause the method described herein to be performed by the ECU 144 may be contained in a computer software product or computer program product (e.g., comprising a non-transitory medium) stored in the memory $144_b$ according to one embodiment of the invention. This computer software product or computer program product may be loaded into and run by the ECU 144. Moreover, the sequences of instructions which when executed cause the method 200 described herein to be performed by the ECU 144 may be contained in an integrated circuit product integrated within the processor $144_a$ (e.g., a software module 500 or hardware modules 502 which may include a coprocessor or memory according to one embodiment). This integrated circuit product may be installed in the ECU 144, as illustrated in FIG. 12. Other methods of operation of the electronic motor assembly 15 as controlled by ECU 144 may be achieved in a similar manner.

Still referring to FIGS. 12 and 15, shown is an operational flowchart 200 example of the electromechanical biasing member 37 of FIG. 4. At step 202, the ECU 144 receives a command signal $144_e$ communicated over the electrical connection(s) 110. At step 204, the ECU 144 processes via the electrical components 148 the command signal $144_e$ (as received by the communication interface $144_d$ coupled to the electrical connections 110 and the processor $144_a$) to produce the actuation signal $144_c$ for delivery to the motor 142. At step 206, the ECU 144 sends the actuation signal $144_c$ to the motor 142, i.e. positioned adjacent to the ECU 144 as shown in FIG. 5. It is recognized that the motor 142 can also draw operational power from the electrical connection(s) 110 (either directly and/or via the electrical components 148 of the ECU 144 e.g. processor $144_a$) in order to process the actuation signal $144_c$ and rotate the motor shaft 157. At step 208, the ECU 144 receives one or more sensor signals $144_f$ from one or more sensors (e.g. hall sensors $148_a$), processes the sensor signals $144_f$ via the other electrical components 148 and sends the results of the sensor signal processing (e.g. indicating the positional state of the closure panel 14) to the control system 16 via the electrical connection(s) 110. For example, the sensor signals $144_f$ represented as analog voltage signal as generated by the sensors $148_a$ may be processed by the ECU 144 and the result of such processing (i.e. filtering, analyzing) is digitized by the communication interface $144_d$ for transmission as a digital message $144_h$ depicted by an arrow to a remote master vehicle system controller 16 for processing thereby. It is recognized that the action of control system 16 in response to receiving the digital message $144_h$ can be simply a display by the vehicle systems for informing an occupant of the vehicle 11 (via the results $144_h$), such as a closure panel 14 active open alert, closure panel 14 fully closed or fully open alert, closure panel 14 obstacle detection alert, and/or control system 16 can contain control processing logic for implementing further process control of the results $144_h$, for example the vehicle system may in conjunction with communication with other vehicle systems, such as a drive or park state module of the vehicle, process the results $144_h$ in conjunction with the drive state to issue a "CLOSE" command to the ECU 144 after the results $144_h$ indicates that the closure panel 14 is in the fully opened position, but the vehicle 10 has now been transitioned from a parked state to a drive state. It is recognized that the ECU 144 can receive a subsequent command signal $144_e$ from the control system 16 as further action when the remote control system 16 is operating as a master controller, and where the ECU 144 is operating as a slave to the master controller. Alternatively, the ECU 144 can generate its own further actuation signal $144_c$ based on the results $144_f$ of the sensor signal processing, an example method of operation of which is now provided.

Figure 16:
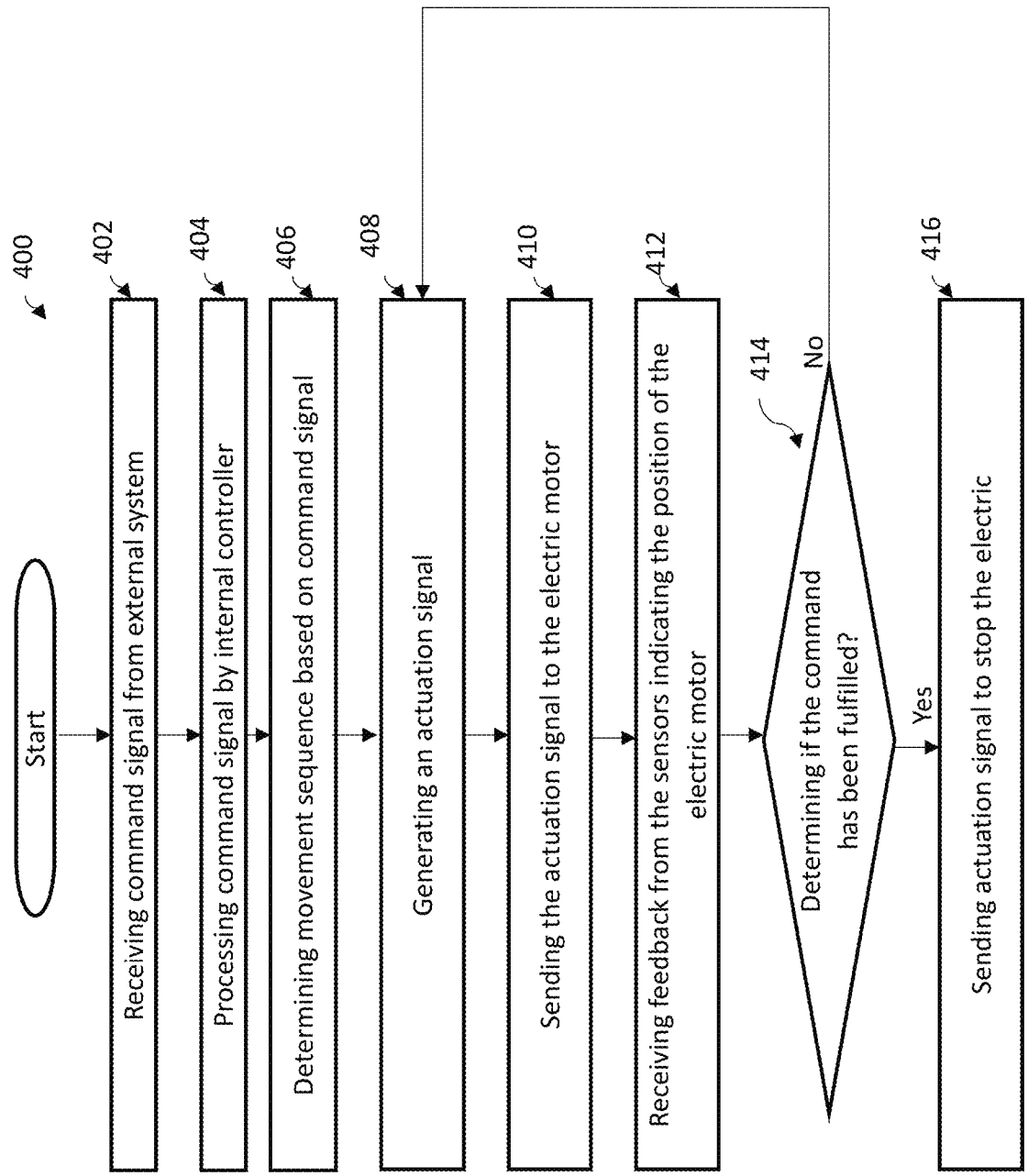
FIG. 16 is flowchart of another example operation of the electromechanical biasing member of FIG. 4 operating as a master controller.

As illustrated in FIG. 16, a method of operating or moving a closure panel (e.g. lift gate 14) using the biasing members 37 incorporating the electronic motor assembly 15 is now described in more detail. In accordance with an illustrative embodiment, the closure panel 14 operation, or moving algorithm, disclosed herein is described for a command for transitioning the closure panel 14 from a fully closed to a fully open position when the ECU 144 of biasing member $37_1$ is operating as a master controller having received a generic open command from an external vehicle system, and optionally if the second biasing member $37_2$ shown in FIG. 2 is operating as a slave to the master controller ECU 144 of biasing member $37_1$. Other commands for operating the closure panel 14 may be provided, such as but not to a command for transitioning the closure panel 14 from the fully opened to the fully closed position, a command for transitioning the closure panel 14 from the fully closed to a partially open position, a command for stopping the closure panel 14 at a third position hold during the transition of the closure panel 14 between the fully opened and the fully closed position. It is understood that the ECU 144 of the electronic motor assembly 15 may be programmed to enable the practice of the method 400, in a like manner as described herein above for the practice of the method 200.

Still referring to FIG. 16, the method 400 includes the step of 402 receiving a command signal $144_e$ (e.g. a generic high level "Fully Open" command to move the closure panel 14 to a fully open position) from an external system (e.g. from Body Control Module in operable communication with the biasing member 37 having received a closure panel open signal from a wireless key fob remote from the vehicle 10 as but an example, or from a switch directly in operable communication with the biasing member 37) via the communication interface $144_d$. Then the method 400 continues by step 404 processing the command signal $144_e$ by the internal control unit (e.g. ECU 144). The step of 404 processing the command signal $144_e$ may include decoding an encoded digital message transmitted over the electrical connection(s) 110 in accordance with a communication protocol, for example a message encoded in accordance with the LIN protocol as discussed hereinabove, to extract/decode the command signal $144_e$. In such a manner, the communication with the biasing member 37 is simplified since the vehicle system 16 issuing the closure panel command to the biasing member 37 does not have to provide any additional control information or understand the operating characteristics or lower hardware level specific operating procedures of the biasing member 37, for example which may be required during the execution of the command as provided by supplementary electrical communication lines carrying feedback signals from the electric motor 142, or other sensors $148_a$, such as hall sensors, as well as additional functionality and instructions which the vehicle system 16 must be so equipped with requiring additional software and/or hardware and added complexity. Additionally, the vehicle control system 16 may issue a single operating command to multiple biasing members 37 interconnected over a network for moving the closure panel 14 in synchronicity, for example as shown in FIG. 2 whereby two biasing members $37_{1,2}$ may operate in tandem to move the closure panel 14. Local decision control and operation of the motor 142 for moving the closure panel 14 is based upon the processing by each ECU 144 of the two biasing members $37_{1,2}$ separately, or one ECU 144 for example the first biasing member $37_1$ may operate as the master controller issuing commands and receiving feedback from the second biasing member $37_2$. In the former configuration, the control of each of the two biasing members $37_{1,2}$ is local and internal to each, each capable of operating in tandem based on the sensed signals of the motor operation 142 indicative of the other one of the two biasing members $37_{1,2}$ actions on the closure panel 14. Additionally, wiring/cabling required for feedback sensors $148_a$ to the remote vehicle control system 16 is eliminated and/or reduced, and sensitivity to electromagnetic noise coupled to such feedback lines external the biasing members 37 is also reduced since the feedback circuits, lines and sensors are housed within the biasing members 37 and isolated from such external interference. The method 400 proceeds with the step of 406 generating an actuation signal $144_c$, for example a Pulse Width Modulated voltage signal as generated by the FETs $148_b$ as controlled by the ECU 144 in a manner as described hereinabove, with the output of the FETs $148_b$ to be supplied to the electrical motor 142, such as a brushed motor 142 as an example, or a ECU 144 may generate a field vector control signal to control the motor driver $144_g$ to supply a three-phase PWM motor voltage output derived from vector signal for the motor 142 in the configuration where the motor 142 is a brushless motor 142. The generated actuation signal $144_c$ may be based on the desired operating sequence of the closure panel 14 based on the command signal $144_e$, either in accordance with a predetermined sequence as stored in memory $144_b$ and/or in combination with actively determined of the state of the closure panel 14 operating parameter, as sensed by the feedback sensors $148_a$; and other desired closure panel movement profiles.

The method 400 continues further with the step of 410 sending the actuation signal $144_c$ to the electric motor 142, for example by controlling the FETS $148_b$ provided for on the PCB 145 which are electrically coupled to the motor blade receptacles $147_a$ via the connection with the motor blades $147_b$ as described hereinabove, to control operation of the electric motor 142. In the configuration where the biasing member $37_1$ operates as the master controller, and the other biasing member $37_2$ operates as the slave controller, the step of 410 may also include sending a command to the ECU 144 of the other biasing member $37_2$ to generate locally the actuation signal $144_c$ to be supplied to the electric motor 142 of the other biasing member $37_2$. The actuation signal $144_c$ is generated by the local FETs $148_b$ as controlled by the ECU 144 in a manner as described hereinabove. Localizing the FETs $148_b$ near or proximate the motor blade receptacles $147_a$ provides an inherent heat sink for the FETS $148_b$ to dissipate heat generated by the FETS $148_b$ during operation. Next, the method 400 proceeds with the step of 412 receiving feedback from the sensors $148_a$ indicative of the operating status of the motor 142 or the closure panel 14, or other operating parameters, such as sensing the speed of rotation the electrical motor shaft 157 from which the closure panel 14 movement, such that speed of the closure panel 14 can be inferred as calculated by the ECU 144, or determining the position of the closure panel 14 as determined by tracking the electric motor shaft 157 revolutions, or other position detection techniques, or detecting if an obstacle is present in the moving path of the closure panel 14 as determined for example by the interpretation of differences in electrical motor shaft revolutions as detected by the hall sensors $148_a$ and an expected motor speed based on the inputted actuation signal $144_c$, or by sensing of an obstacle by a proximity sensor in communication with the ECU 144; or receiving feedback related to the angle of inclination of the vehicle 10 relative to a unlevel vehicle surface 9 to perform motor torque output adjustments to the actuation signals $144_c$. Such receiving feedback from the sensors $148_a$ can be done either locally by the master controller ECU 144 for determining the operating status of the motor 142 of the biasing member $37_1$ when operating as the master controller, or remotely as received by the master controller ECU 144 of biasing member $37_1$ as transmitted over communication network from the slave controller ECU 144 of the other biasing member $37_2$.

Next the method 400 continues with the step of 414 determining if the command has been met, for example by comparing stored closure panel state information stored in memory $144_b$ and comparing with the sensor data received by the ECU 144 during operation of the closure panel 14.

Next the method 400 continues with the step of 416 sending the actuation signal $144_c$ to stop the electric motor 142 upon the command being met e.g. the electrical motor 142 will be stopped upon the closure panel 14 reaching a desired position e.g. fully open. A similar command signal (e.g. subcommand signal $144_i$) transmitted over the communication network by the ECU 144 of the master controller of the biasing member $37_1$ to the slave controller ECU 144 of the other biasing member $37_2$ may also be performed. The method 400 further continues with the step of 416 returning to the step of 410 generating an actuation signal $144_c$, which may be adjusted by the ECU 144 as a result of the feedback by the sensors $148_a$, to the electric motor 142. if the command condition has not be met e.g. if the closure panel 14 has not moved to a fully opened position. If at step 414 it is determined that the command condition has been met, then the next step of the method 400 is 416 sending the actuation signal $144_c$ to stop the electric motor 142.

Now referring to FIG. 17A, there is illustrated a distributed master/slave architecture system 599 for operating a closure panel 14 using a biasing member $37_1$ operating as the master controller 602 for receiving generic commands (e.g. $144_e$) from a remote vehicle control system 16, and the other biasing member $37_2$ operates as the slave controller 608, for receiving command signals (e.g. sub-command signals $144_i$) from the master controller 602 and transmitting feedback signals $144_h$ to the master controller 602, with the signals being transmitted and received over the communications link 590, such as a vehicle communication network (e.g. using at least in part electrical connection(s) 110). In accordance with this illustrative embodiment the master controller 602 controls its local motor 142, as well as the remote motor 142 of the slave biasing member $37_2$ to move the closure panel 14. In an illustrative embodiment, the remote vehicle control system 16 is a latch 43, such as a smart latch having local intelligence and processing capabilities. In another illustrative embodiment, the remote vehicle control system 16 is a latch controller 116 provided separate from the latch 43.

Now referring to FIG. 18A, in addition to FIG. 17A, there is provided a schematic diagram exemplifying the exchange of communications of command signals to move a closure panel 14 from a first position to a second position, with the exchange of communications occurring between a remote vehicle control system 16 issuing a generic high level open command signal 600, the ECU 144 of a master controller 602 of a first biasing member $37_1$ generating a local actuation signal 604 to operate a local motor 142 and issuing a second subcommand signal 606 (e.g. $144_i$) for transmission over a communication network (e.g. communication link 590) to the ECU 144 of a slave controller 608 of a second biasing member $37_2$. The ECU 144 of a master controller 602 of a first biasing member $37_1$ also receiving a feedback signal 611 (e.g. $144_f$) of the operation of the local motor 142. The ECU 144 of a slave controller 608 of a second biasing member $37_2$ generates a local actuation signal 610 (e.g. $144_c$) to operate a local motor 142 and generates a feedback signal 612 (e.g. $144_h$) of the operation of the local motor 142 and transmits the feedback signal 612 over the communication network 590 to the ECU 144 of a master controller 602 of a first biasing member $37_1$. The ECU 144 of a master controller 602 of a first biasing member $37_1$ processes the feedback signals 611, 612. In the illustrative embodiment, the command has not been fulfilled at this point and the ECU 144 of a master controller 602 of a first biasing member $37_1$ generating in response another local actuation signal 604 to operate a local motor 142 and issuing another subcommand signal 606 for transmission over the communication network 590 to the ECU 144 of a slave controller 608 of a second biasing member $37_2$. The ECU 144 of a master controller 602 of a first biasing member $37_1$ also receiving a feedback signal 611 of the operation of the local motor 142 and the ECU 144 of a slave controller 608 of a second biasing member $37_2$ generates another local actuation signal 610 to operate a local motor 142 and generates another feedback signal 612 of the operation of the local motor 142 and transmits the additionally sensed feedback signal 612 over the communication network 590 to the ECU 144 of a master controller 602 of a first biasing member $37_1$. The ECU 144 of a master controller 602 of a first biasing member $37_1$ processes again the feedback signals 611, 612. In the illustrative embodiment, the ECU determines the command has been fulfilled (e.g. closure panel 14 has been moved to the desired position communicated in the generic command signal 600, and ECU 144 has compared the actual detected position of the closure panel 14 and compared the position to an expected position representative of a fulfilled command signal as an illustrative example) and the ECU 144 of a master controller 602 of a first biasing member $37_1$ generating another local actuation signal 604 to stop the local master motor 142 and issuing another subcommand signal 606 for transmission over the communication network 590 to the ECU 144 of a slave controller 608 of a second biasing member $37_2$ to stop the local slave motor 142 of the second biasing member $37_2$. A command complete signal 616 (e.g. $144_h$) is transmitted to the remote vehicle control system 16 to perform a vehicle system action, such as activate an alert (visual, or audio) or perform other actions as desired by the remote vehicle system 16.

Now referring to FIG. 17B, there is illustrated a distributed master/slave architecture system 598 for operating a closure panel 14 using a biasing member $37_1$ operating as the slave controller 620 for receiving detailed operating commands (e.g. $144_e$) from a remote vehicle master controller system 16, and the other biasing member $37_2$ operating as another slave controller 622, for also receiving detailed operating commands from a remote vehicle master controller system 16. Both slave controllers 620, 622 are configured, in a manner as described hereinabove to transmit feedback signals to the master controller 618, with the signals being transmitted and received over the communications link 590, such as a vehicle communication network. In accordance with this illustrative embodiment the master controller 16 controls the local motors 142 of each biasing member $37_1$, $37_2$ to move the closure panel 14. In an illustrative embodiment, the remote vehicle master controller system 16 is a latch 43, such as a smart latch having local intelligence and processing capabilities. In another illustrative embodiment, the remote vehicle master controller 16 is a latch controller 116 provided separate from the latch 43.

Now referring to FIG. 18B, in addition to FIG. 17B, there is provided a schematic diagram exemplifying the exchange of communications of command signals to move a closure panel 14 from a first position to a second position, with the exchange of communications occurring between a remote vehicle master control system 16, generically referred to using the reference number 618, issuing a detailed level open command signal 630, the ECU 144 of a slave controller 622 of a first biasing member $37_1$ generating a local actuation signal 623 to operate a local motor 142 in response to receiving the command signal 630, and remote vehicle master control system 16, 618 issuing a detailed level open command signal 630 for transmission over a communication network 590 to the ECU 144 of a slave controller 622 of a second biasing member $37_2$, the ECU 144 of a slave controller 622 of the second biasing member $37_2$ generating a local actuation signal 624 to operate a local motor 142 in response to receiving the command signal 630. The level of detail of the open command signal 630 may vary depending on the system configuration and may include lower level details such as motor speed, position, control actions, operating modes, adjusted commands based on received feedback from each slave controller 620, 622 etc. The ECU 144 of a slave controller 620 of a first biasing member $37_1$ also providing a feedback signal 633 (e.g. $144_h$) of the operation of the local motor 142. The ECU 144 of a slave controller 622 of a second biasing member $37_2$ generates a local actuation signal 624 to operate a local motor 142 and generates a feedback signal 631 (e.g. $144_h$) based on the operation of the local motor 142 and transmits the (e.g. $144_h$) over the communication network 590 to the remote vehicle master controller system 16. The ECU 144 of the slave controller 620 of a first biasing member $37_1$ processes internally sensed feedback signals 633. The ECU 144 of the slave controller 620 of the second biasing member $37_2$ processes internally sensed feedback signals 631. In the illustrative embodiment, vehicle master controller system 16, 618 determines that command has not been fulfilled based on the received feedback signals 631, 633 and the vehicle master controller system 16, 618 issues another detailed level command signal 630 to the slave controllers 620, 622. In response, ECUs 144 of a slave controllers 620, 622 of a first biasing member $37_1$ and second biasing member $37_2$ generate another local actuation signal 623, 624 to operate a local motor 142. The ECU 144 of a slave controllers 620,622 of a first biasing member $37_1$ and second biasing member $37_2$ also sense and transmit to remote vehicle master controller system 16, 618 newly acquired feedback signals 631, 633 of the operation of the local motor 142 in response to the new local actuation signals 623, 624 over the communication network 590 to the vehicle master controller system 16. The vehicle master controller system 16, 618 processes again the new feedback signals 631, 633 to determine if the command condition has been met. In the illustrative embodiment, the command has been fulfilled (e.g. closure panel 14 has been moved to the desired position) and the vehicle master controller system 16, 618 issuing another command signal 640 for transmission over the communication network 590 to the ECUs 144 of a slave controller 620,622 of first biasing member $37_1$ and second biasing member $37_2$ to stop the local motors 142. ECUs 144 of a slave controllers 620, 622 of the first biasing member $37_1$ and second biasing member $37_1$ generating in response to command signal 640 another local actuation signal 626 to stop the local motors 142. It is recognized that during operation of motors 142 by the slave controllers 620,622, the slave controller 620,622 may operate in modes, either as directed by the vehicle master controller system 16, 618, or as automatically performed. For example, the slave controller 620,622 may be set to operate in an obstacle detection mode whereby despite the issued command signals 630 to move the closure panel, in the even the slave controller 620,622 locally determine an obstacle is present, the slave controller 620,622 will override the command signal and issue an actuation signal in response to the detected obstacles e.g. stop the motor 142.

Referring to FIGS. 17A, 17B, 18A, 18B, the master controller (e.g. master controller 602, control system 16) can be a latch controller (i.e. a controller on-board of the latch 43 represented as an e-latch). Alternatively, the master controller (e.g. master controller 602, control system 16) can be represented by latch control system 116 (see FIG. 19). In terms of communications of signals (e.g. $144_{e, f, h}$) between the master controller (e.g. 602, 618 16) and the slaver controller(s) (e.g. 620, 622) the ECU 144 (of the slave controller 620, 622) receives the command signal (e.g. $144_e$) communicated over the electrical connection(s) 110 as received from the master controller (e.g. 602, 618, 16). The ECU 144 processes (via the electrical components 148) the command signal $144_e$ to produce and send the actuation signal $144_c$ for local delivery to the motor 142 for processing by the motor 142. The motor 142 can draw operational power from the electrical connection(s) 110 in order to process the actuation signal $144_c$ and rotate the motor shaft 157. The ECU 144 can also receive one or more sensor signals $144_f$ from one or more sensors, process the sensor signals $144_f$ via the other electrical components 148 and send the results of the sensor signal processing to the master controller 602,618, 16 via the electrical connection(s) 110. Alternatively, the sensor signals $144_f$ can be sent (unprocessed or partially processed) by the ECU 144 to the remote master vehicle system controller 602, 618, 16 for processing thereby.

The ECU 144 can receive a subsequent command signal $144_e$ (e.g. stopping the motor 142) from the master controller (e.g. 16, 602, 618) as further action and where the ECU 144 is operating as a slave to the master controller. Alternatively, the ECU 144 can generate its own further actuation signal $144_c$ (e.g. stopping the motor 142) based on the results $144_f$ of the sensor $148_a$ signal processing.

The received feedback from the sensors $148_a$ can be indicative of the operating status of the motor 142 or the closure panel 14. Other operating parameters as the received feedback can be parameters such as but not limited to any one or more of: sensing the speed of rotation the electrical motor shaft 157; determining the position of the closure panel 14; detecting if an obstacle is present in the moving path of the closure panel 14; and/or receiving feedback related to the angle of inclination of the vehicle 10 relative to a unlevel vehicle surface 9. Such receiving feedback from the sensors $148_a$ can be done locally by the ECU 144 of the slave controller ECU 144. Alternatively, receiving feedback from the sensors $148_a$ can be done remotely as received by the master controller ECU 144 as transmitted over communication network from the slave controller ECU 144.

In operation, the control system 16 controls the operation of an electromechanical strut 37 for moving a closure panel 14 between an open position and a closed position relative to a motor vehicle body 11, the electromechanical strut comprising a housing 35 comprising an inner cavity 124, and an electric motor 142 positioned within the inner cavity 124, the control system comprising: a module 116 associated with a vehicle latch 34, the module comprising a master controller 602 configured to issue commands $144_e$ to move the closure panel 14 between an open position and a closed position; and a slave controller 620 remote from and in communication with the master controller 602 to receive the commands, the slave controller 620 comprising: a control unit 144 positioned within the inner cavity and configured to drive the electric motor 142, the controller comprising: at least one controller board 145 juxtaposed to the electric motor 142; at least one computing device mounted to the at least one controller board and configured to execute instructions to generate a control command $144_e$ to drive the electric motor 142, the at least one computing device comprising at least a data processor $144_a$ and a memory $144_b$ storing the instructions 159, the memory $144_b$ being coupled to the data processor $144_a$; and a plurality of control components 148 mounted to the at least one controller board 145 configured to supply a drive signal $144_c$ based on the control command $144_e$ to the electric motor and receive signals $144_h$ representative of an electric motor operation.

In the above illustrative method and systems, the processing of a received command signal $144_e$ from an external vehicle control system 16 is performed local and internal to the biasing member 37, as well as the processing of feedback signal (e.g. $148_a$) from the biasing member 37, and the generation of control signals (e.g. actuation signals $144_c$) to be supplied to the electric motor 142, alleviating the control complexity required by the external vehicle system 16, simplifying communication with the control system 16 and one or more biasing members 37, as well as reducing wiring and installation complexity, as will now be explained in more details.

Figure 20:
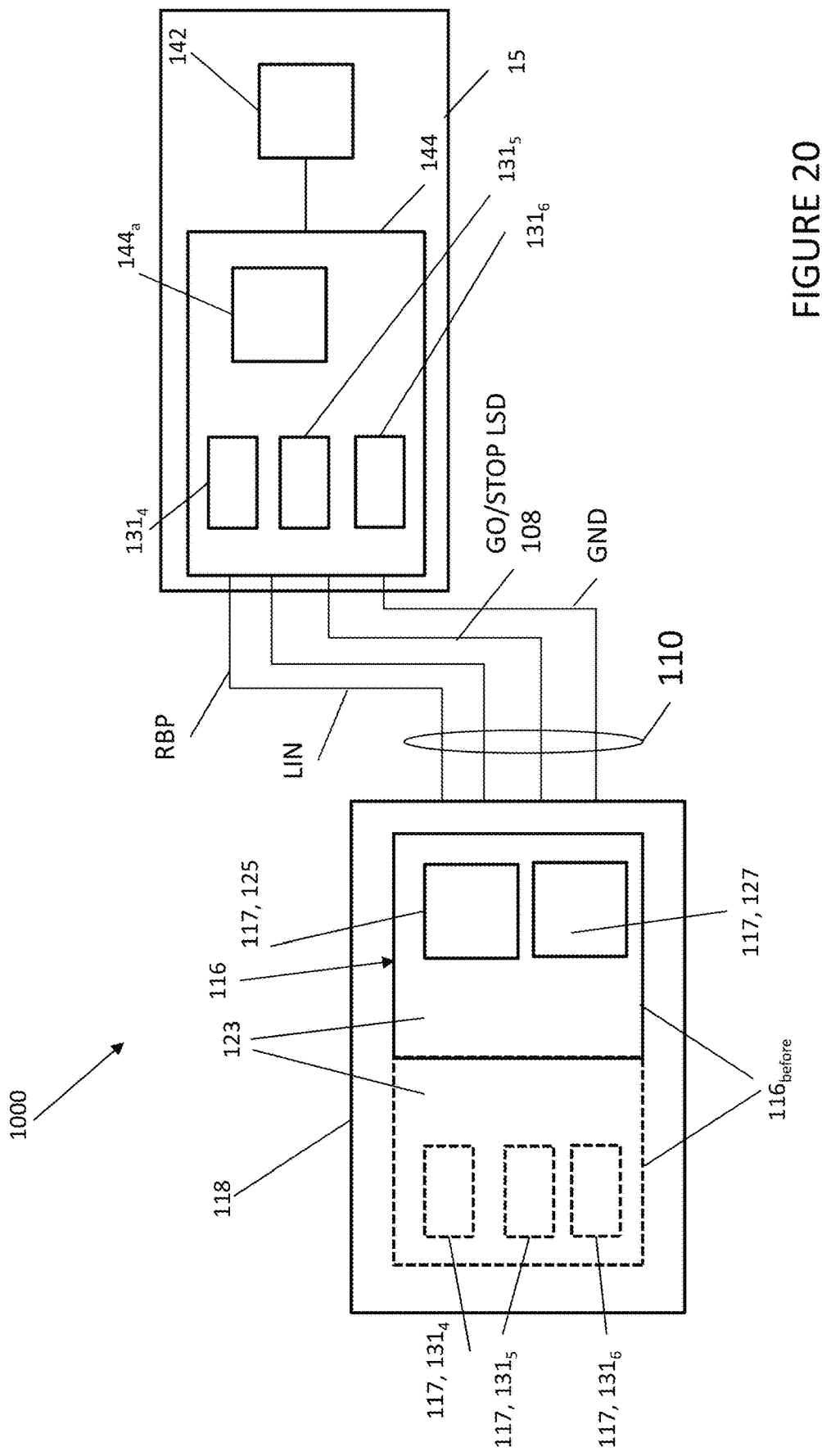
FIG. 20 is a block diagram of a distributed system architecture of an electromechanical biasing member control system employing the latch control module of FIG. 19.
Figure 21:
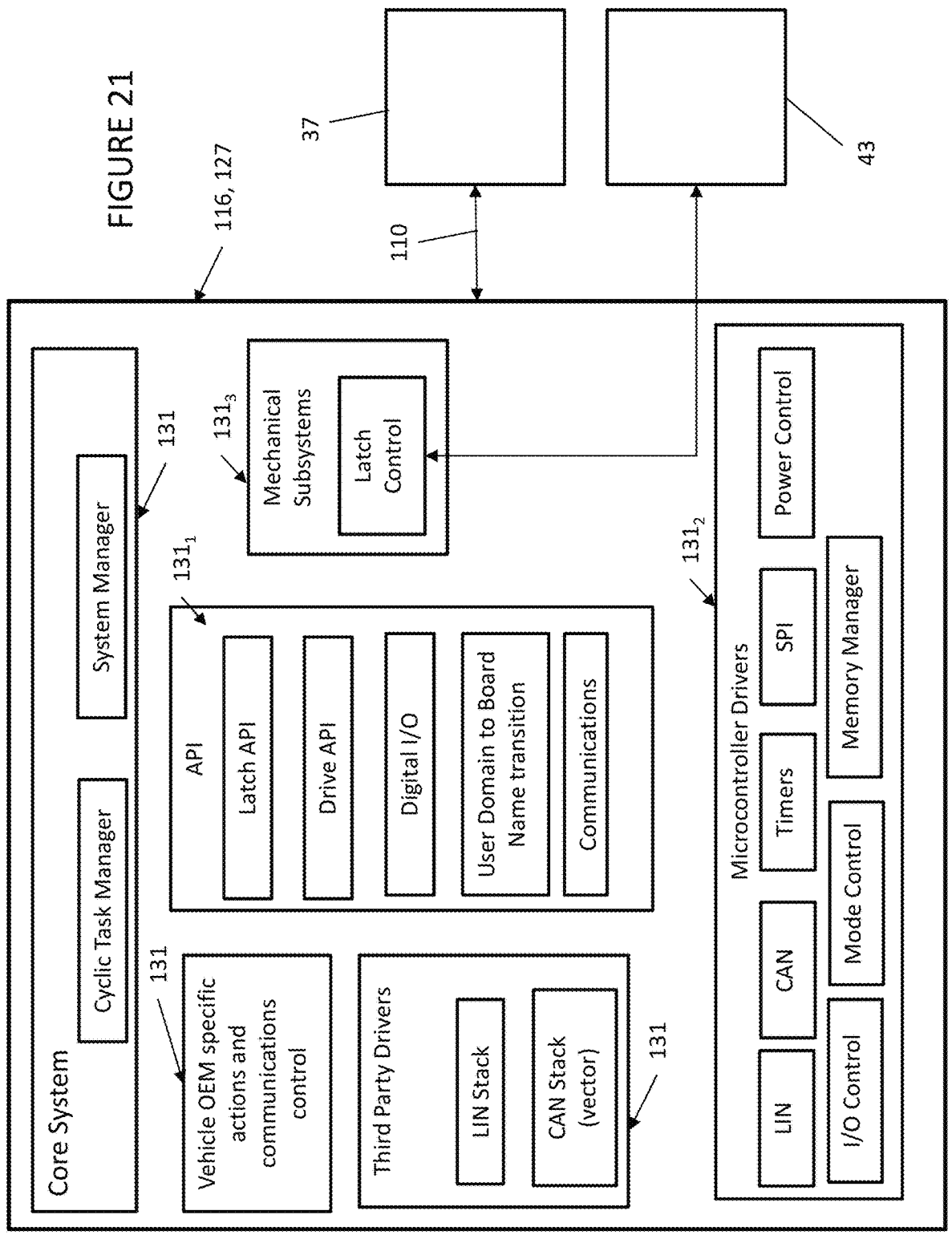
FIG. 21 is a block diagram of the system modules of the latch control module of FIG. 19 operating as part of a distributed control system architecture including at least one electric motor assembly of FIG. 4.

Now referring to FIG. 19 to FIG. 23, there is illustrated an example of the latch control system 116 providing the control signals 108 to the integrated electronic motor assembly 15 of a biasing member 37 forming part of a distributed biasing member control system 1000, in accordance with an illustrative embodiment. The control system is illustratively a remotely located control system to the housing 35 of the biasing member 37, such as a latch control system 116 located within the closure panel 14 as illustrated in an embodiment of FIG. 2. Latch control system 116 may optionally also be located on the vehicle body 11. Latch control system 116 includes a housing 118 for enclosing various latch control electronic components 117. The housing 118 may include mounting features, such as apertures 120 for fixing the housing 118 to the vehicle body 11 or within closure panel 14 such as a door module (not shown) using screws or other connectors e.g. snaps, rivets, nuts and bolts, or otherwise. The latch control system 116 includes a printed circuit board 123 enclosed by the housing 118 for supporting the various latch control electronics 117 thereto in coordinated electrical communication with one another. Such electronic components 117 may include hardware and software components such as microcontrollers 125 and memory modules 127, such as microchips, for storing instructions for execution by the microcontrollers 125, as well as resistors, inductors, and capacitors and other signal conditioning/supporting components for operating the microcontroller 125 and memory modules 127 of the latch control system 116. For example, instructions stored on the memory module 127 may be related to various system modules 131 as illustrated in FIG. 21, for example application programming interfaces (API) modules $131_1$ for a latch API, drive API, digital input output API, Diagnostic API, Communication API, and communication drivers for LIN communications and CAN bus communications. Also provided are microcontroller drivers $131_2$ such as LIN drivers, CAN drivers, SPI, I/O control, power control, memory manager and mode control for microcontroller management, control functions, and input/output control modules. Also provided are mechanical subsystem modules $131_3$, such as for latch control of latch 43 and interfacing therewith. Other software and/or hardware architecture modules 131 may also be provided as part of the illustrative distributed system architecture 1000 of FIG. 21. While modules are described as being loaded into a memory, such as memory module 127, it is understood that the modules could be implemented in hardware and/or software. Absent from the latch control system 116 forming part of a distributed biasing member control system 1000, in accordance with an illustrative embodiment are biasing member 37 related control modules, such as FET hardware and software $131_4$, 170, FET APIs $131_5$, 190, biasing member diagnostics control $131_6$, 139, timers $131_7$ and sensor related modules and systems $131_8$, as but examples, which can now be localized to the integrated electronic motor assembly 15, as illustrated in FIG. 20.

Figure 22:
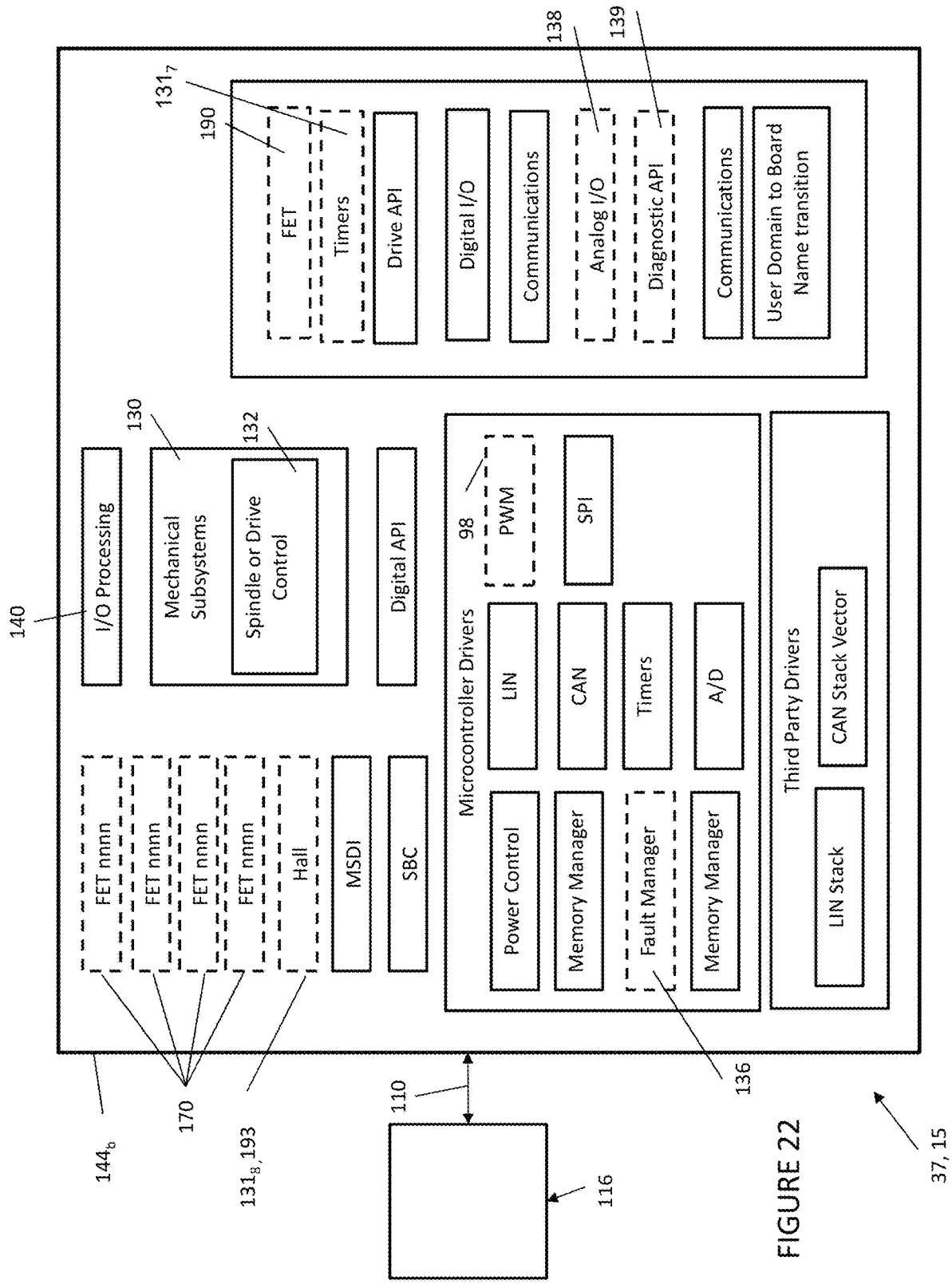
FIG. 22 is a block diagram the system modules of the electric motor assembly of FIG. 4 operating as part of a distributed control system architecture, in accordance with an illustrative embodiment.

As illustrated in FIG. 22, and with further reference to FIGS. 20 and 21, the latch control system 116 operation and physical configuration is simplified when used in combination with the integrated electronic motor assembly 15 to control the biasing member 37 as described herein above. Due to the integrated controller ECU 144 provided within the integrated electronic motor assembly 15, control and operation decisions can be made/calculated locally to the biasing member 37 as compared to currently known latch control systems (indicated by reference number $116_{before}$ in ghosted view of FIG. 23) where control and operation decisions for the biasing member 37 would have be made/calculated remotely at the latch control system $116_{before}$. It is recognized that various hardware and software components and modules typically associated with the existing latch control system $116_{before}$ can be consequently reduced or eliminated from the latch control system 116, and rather provided within the biasing member 37 with integrated electronic motor assembly 15 as described herein above. For example, mechanical subsystem control modules 130 functionality (i.e. related hardware and software components), such as the biasing member' and drive control modules 132, as well as the FET drivers 170, FET API modules 190 (e.g. $131_5$), the fault manager module 136, a Pulse Width Modulation driver 98 and analog sensor modules 138 for feedback sensors $148_a$ can now reside locally to the integrated electronic motor assembly 15, as opposed to residing with the latch control system 116. It is recognized that the component count of the latch control system $116_{before}$ can be reduced, as illustrated by the ghosted portion of the components eliminated in FIG. 20 and in FIG. 23, and the footprint of the latch control system $116_{before}$ e.g. the PCB size and physical dimension of the housing 118, can also be reduced, as also shown in ghosted illustration in FIG. 23, when using the latch control system 116 in conjunction with the integrated electronic motor assembly 15 as described above. For example, as illustrated in phantom outline in FIGS. 20 and 23, the FET drivers 170 and corresponding PCB footprint 180 in latch control system $116_{before}$ required to mount the FETs 170 thereto can be eliminated having been integrated as integrated FETs 170 (i.e. FETS $148_b$) into the integrated electronic motor assembly 15, i.e. the FETs 170 are mounted to the PCB 145 of the integrated electronic motor assembly 15, thereby reducing the packaging size of the latch control system $116_{before}$. Also, corresponding FET control software modules, such as the FET API $131_5$, shown as block 190 in FIG. 22, can be moved from the latch control system memory module 127 (of the latch control system $116_{before}$) and moved locally to the memory $144_b$ of the integrated electronic motor assembly 15, and further having FET control software instructions executed locally by the processor $144_a$. Also, wiring/cabling carrying electrical signals from the FETs 170 previously provided on the latch control system $116_{before}$ can also be removed, reducing wire count between the latch control system 116 and the integrated electronic motor assembly 15, being replace with the electrical connection(s) 110. In lieu, a simplified high level generic command instruction can be sent over the electrical connection(s) (e.g. communication lines) 110 by the latch control system 116, for example a command either for activating the opening of the closure panel 14, closing the closure panel 14, can be transmitted to the integrated electronic motor assembly 15 with the integrated electronic motor assembly 15 handling and processing the lower lever hardware specific operations to execute and fulfill high level command, as discussed hereinabove. When reference is made herein to an Application Programming Interface (API), it may also be understood to include the underlying related software and/or hardware of that labelled API i.e. the FET API may include the hardware and/or software required for controlling the FETs through which the FET API may interface and communication with.

Figure 23:
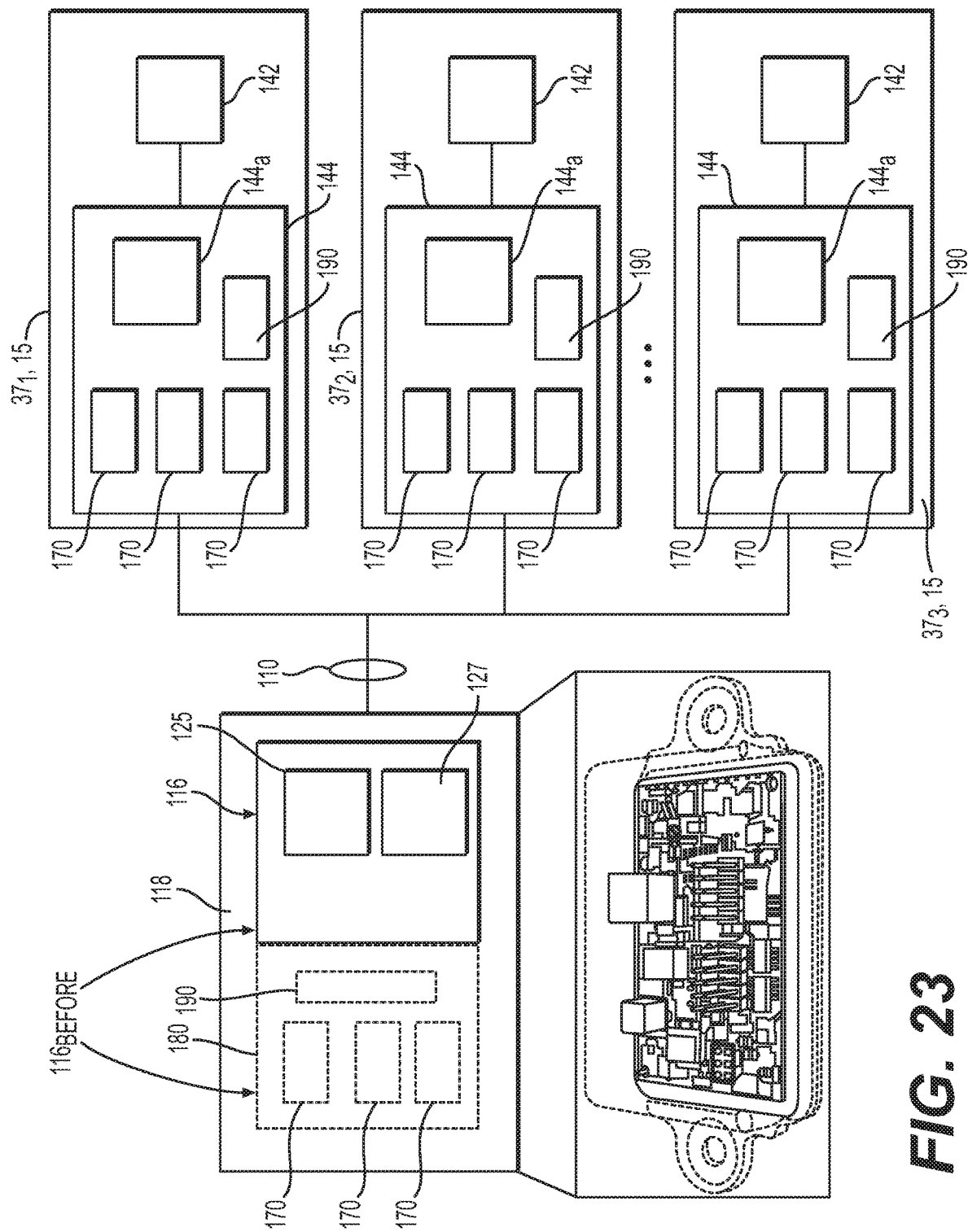
FIG. 23 is a block diagram of a distributed control system for controlling movement of a closure panel including a latch controller and at least one electric motor assembly of FIG. 4, in accordance with an illustrative embodiment.

While the control and hardware components related to the FETs, such as the FET drivers 170, and FET API modules 190 have been illustrated in FIG. 23 as now integrated with the integrated electronic motor assembly 15, it is understood that other control and hardware components can be integrated with the integrated electronic motor assembly 15 as would have been implemented by the remote latch control system $116_{before}$ e.g. hall effect drivers 193, Diagnostic API 139. Specific calculations for the control of the biasing member 37 i.e. speed, obstacle detection, can be carried out locally to the biasing member 37 in a manner as described above. Also the distributed and now local control provided by the ECU 144 of a biasing member 37 can provide for an easily scalable system based on the master and slave architecture, whereby the latch control system 116 operates as the master controller, while the ECU(s) 144 of the biasing member(s) 37, which may include more than one biasing members $37_{1, 2, 3}$ as shown in FIGS. 17B and 23 in communication with the master latch control system 116, thereby operating as slaves to the latch control system 116 acting/operating as the master controller. As such only a simplified generic commands, such as STOP or START commands can be issued by the latch control system 116 acting as the master controller to the one or more (e.g. multiple) slave controller(s) (i.e. one or more respective ECUs 144) without the necessity of the latch control system 116 having to consider the number of slaves (i.e. number of ECUs 144), process the feedback signals from the slaves, require hardware/software to operate specific functionality of the biasing member 37 (e.g. if biasing members are of different types), or process the control signals required to operate each integrated electronic motor assembly 15, which is now undertaken by the respective ECU 144 contained within the housing 35 of the respective biasing member 37.

As such, the above described electromechanical biasing member 37 with integrated electronic motor assembly 15 provides for an integrated controller ECU 144 with other electronic components 148 (e.g. sensors, drivers, SIP electronics, controller, etc.) all housed within a motor housing (e.g. the lower housing 112 portion) of the housing 35. It is recognized that having the components 148 in close proximity to the motor 142, i.e. within the housing 35, facilitates the reduction of signal noise that would otherwise be present when such unprocessed (either in whole or in part) signals are transferred external to the housing 35 to a remotely located processor of a vehicle control system 16 (i.e. using the electrical connection(s) 110 going through a wall of the housing 35). It is also recognized that positioning of the ECU 144 and the motor 142 within the housing 35 provides for a more compact footprint of the electromechanical biasing member 37, such that the internally controlled electromechanical biasing member 37 has greater applicability in tighter or industry standard footprint requirement applications, and can replace existing biasing members of like dimensions without need for modification of the receiving footprint. As such, the stacked arrangement of both the ECU 144 (e.g. the PCBs 145) and the motor 142 along the longitudinal axis 41 of the electromechanical biasing member 37 provides for the ability of the integrated biasing member 37 to be installed in existing configurations without having to substantively modify the existing mounting area in the vehicle 10 to accommodate the electromechanical biasing member 37. In terms of having the sensor components 148 located adjacent to the signal processing components 148 of the same or adjacent PCBs 145 of the ECU 144 located within the housing 35, extra wiring/cabling for the sensors $148_a$ can be reduced, if not eliminated (i.e. reduction and/or elimination of wires passing sensor signals $144_f$ through the housing 35 walls). For example, electromagnetic (EM) noise or interference is less likely to be picked up between the sensors components $148_a$ and the electronic components 148 since the mounting of the sensors $148_a$ via wires/electronic connections between the sensors $148_a$ and the PCB circuits is significantly shortened and therefore shielded by the housing 35 itself. As such, the location of the sensor components $148_a$ adjacent to the spindle (e.g. lead screw 140 with coupled extension member 40), along with sensor signal processing capabilities via processing components 148 of the ECU 144, provides for significant advantages as noted above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example detection system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

We claim:

1. A system for moving a closure panel between an open position and a closed position relative to a motor vehicle body, the system comprising:
a latch comprising a master controller configured to issue a command signal to move the closure panel between the open position and the closed position; and
at least one electromechanical biasing member comprising:
an electric motor for moving the closure panel between the open position and the closed position; and
a slave controller housed within the at least one electromechanical biasing member, the slave controller in communication with the master controller and configured to receive the command signal and to generate an actuation signal based on the command signal for supply to the electric motor to move the closure panel;
wherein the master controller is housed within the latch.

2. The system of claim 1, wherein the master controller is further configured to control the latch.

3. The system of claim 1, wherein the slave controller includes field-effect transistors for generating the actuation signal.

4. The system of claim 1, wherein the slave controller is configured to transmit feedback signals to the master controller.

5. The system of claim 1, wherein the master controller includes a single microcontroller.

6. The system of claim 1, wherein the master controller is configured to receive a signal from a source and issue the command signal in response to receiving the signal from the source.

7. The system of claim 6, wherein the source is one of a key fob, a handle, a switch, or a button.

8. The system of claim 6, wherein the command signal is an open command or a close command.

9. The system of claim 1, wherein the slave controller and master controller are in communication via a communication network.

10. The system of claim 9, wherein the master controller and the slave controller each include a communication interface adapted for communication over the communication network.

11. The system of claim 10, wherein the communication network includes a network bus, an electrical ground, and a power supply line.

12. The system of claim 1, wherein the master controller is in communication with a Body Control Module.

13. The system of claim 1, wherein the master controller is configured to activate an audio or visual alert.

14. The system of claim 1, wherein the slave controller is in communication with a proximity sensor for detecting objects between the closure panel and the vehicle body, wherein the slave controller is configured to stop the movement of the closure panel when an object is detected using the proximity sensor.

15. The system of claim 14, wherein the proximity sensor is provided in the latch and the proximity sensor is in communication with the slave controller.

16. A system for moving a closure panel between an open position and a closed position relative to a motor vehicle body, the system comprising:
a latch comprising a master controller configured to issue a command signal to move the closure panel between the open position and the closed position; and
at least one electromechanical biasing member comprising:
an electric motor for moving the closure panel between the open position and the closed position; and
a slave controller housed within the at least one electromechanical biasing member, the slave controller in communication with the master controller and configured to receive the command signal and to generate an actuation signal based on the command signal for supply to the electric motor to move the closure panel;
wherein the closure panel is a lift gate and the latch is a lift gate latch.

17. The system of claim 1, wherein the at least one electromechanical biasing member includes two electromechanical biasing members each in communication with the master controller.

18. A system for moving a closure panel between an open position and a closed position relative to a motor vehicle body, the system comprising:
a latch comprising a master controller configured to issue a command signal to move the closure panel between the open position and the closed position; and
at least one electromechanical biasing member comprising:
an electric motor for moving the closure panel between the open position and the closed position; and
a slave controller housed within the at least one electromechanical biasing member, the slave controller in communication with the master controller and configured to receive the command signal and to generate an actuation signal based on the command signal for supply to the electric motor to move the closure panel;
wherein the slave controller is configured to diagnose faults and to communicate the faults to the master controller.

19. A system for moving a closure panel between an open position and a closed position relative to a motor vehicle body, the system comprising:
a latch comprising a master controller configured to issue a command signal to move the closure panel between the open position and the closed position; and
at least one electromechanical biasing member comprising:
an electric motor for moving the closure panel between the open position and the closed position; and
a slave controller housed within the at least one electromechanical biasing member, the slave controller in communication with the master controller and configured to receive the command signal and to generate an actuation signal based on the command signal for supply to the electric motor to move the closure panel:
wherein the at least one electromechanical biasing member further comprises:
a housing comprising an inner cavity, the housing for connecting to one of the closure panel and the motor vehicle body, wherein the electric motor and the slave controller are positioned within the inner cavity;
a rotary output member operatively coupled to a motor shaft of the electric motor, the rotary output member rotatable in response to a rotation of the motor shaft; and
an extension member for connecting to the other one of the closure panel and the motor vehicle body, the extension member configured to extend and retract relative to the housing in response to the rotation of the rotary output member to move the closure panel between the open position and the closed position.

20. A system for moving a closure panel between an open position and
a closed position relative to a motor vehicle body, the system comprising:
a motor assembly comprising an electric motor for moving the closure panel between the open position and the closed position, the motor assembly controlled by a local controller contained within a housing of the motor assembly; and
a remote controller in communication with the local controller, the remote controller configured to issue a command signal to move the closure panel between the open position and the closed position;
wherein the local controller is configured to receive the command signal and generate an actuation signal based on the command signal for supply to the electric motor to move the closure panel.

* * * * *